United States Patent
Ono et al.

(10) Patent No.: US 8,036,521 B2
(45) Date of Patent: Oct. 11, 2011

(54) IMAGE PICKUP APPARATUS AND FOCUS CONTROL METHOD

(75) Inventors: Riichi Ono, Osaka (JP); Shinichi Fujii, Osaka (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 12/592,765

(22) Filed: Dec. 2, 2009

(65) Prior Publication Data

US 2010/0150538 A1 Jun. 17, 2010

(30) Foreign Application Priority Data

Dec. 15, 2008 (JP) ................................ P2008-318180

(51) Int. Cl.
G03B 3/00 (2006.01)
(52) U.S. Cl. ........................................................ 396/104
(58) Field of Classification Search .................. 396/104, 396/128

See application file for complete search history.

(56) References Cited

U.S. PATENT DOCUMENTS 6,597,868 B2 * 7/2003 Suda ............................ 396/111
2008/0025714 A1 * 1/2008 Ishii ............................ 396/104

FOREIGN PATENT DOCUMENTS

JP 2008-147821 A 6/2008

* cited by examiner

*Primary Examiner* — W. B. Perkey
*Assistant Examiner* — Noam Reisner
(74) *Attorney, Agent, or Firm* — Lerner, David, Littenberg, Krumholz & Mentlik, LLP

(57) ABSTRACT

An image pickup apparatus includes an imaging element having a group of AF pixel pairs that realizes a pupil-dividing function and a group of normal pixels without such a pupil-dividing function. The image pickup apparatus performs focus control for driving a focus lens toward an in-focus position detected by phase different AF based on a pixel signal generated from the group of AF pixel pairs when it is determined that the reliability of the phase difference AF is high based on the pixel signal. The image pickup apparatus performs focus control for driving a focus lens in an in-focus direction detected by contrast AF based on a pixel signal generated from the group of normal pixels when it is determined that the reliability of the phase difference AF is low.

4 Claims, 14 Drawing Sheets

IMAGE PICKUP APPARATUS AND FOCUS CONTROL METHOD

CROSS-REFERENCE TO RELATED APPLICATION

The present application claims priority from Japanese Patent Application No. JP 2008-318180 filed in the Japanese Patent Office on Dec. 15, 2008, the entire content of which is incorporated herein by reference.

BACKGROUND OF THE INVENTION

1. Field of the Invention

The present invention relates to an image pickup apparatus having an imaging element with a first pixel group that realizes a pupil-dividing function.

2. Description of the Related Art

Some of imaging elements have specific pixels (pixels for phase difference AF) for performing autofocus control with a phase difference detection system (hereinafter, also referred to as a "phase difference AF").

For instance, Japanese Published Patent Application No. 2008-147821 discloses an image pickup apparatus provided with an imaging element having a plurality of pixel pairs for phase difference AF in which the centers of openings of the respective light-shielding plates are oppositely biased from each other with respect to the center of a microlens (hereinafter, also referred to as an imaging element with phase-difference detection function). Such an image pickup apparatus is configured such that a distance from a subject can be performed by allowing pixels for phase difference AF to receive light fluxes passed through a pair of portion areas on an exit pupil of a photographic lens.

SUMMARY OF THE INVENTION

However, the image pickup apparatus of the above patent document employs the imaging element with phase-difference detection function, allegedly having a comparatively small range of allowable distance measurement. Therefore, if the amount of defocus is large when starting the AF operation (significantly blurred state), focusing is out of an allowable range of distance measurement and the phase difference AF becomes difficult to be carried out. In such a case, a lens drive will be carried out until a focus lens goes into an allowable range of distance measurement. However, if the lens is driven in the opposite direction from the point of focus, a quick AF operation (focus control) will become difficult.

It is therefore desirable to provide an image pickup apparatus that can perform a suitable focus control even when the phase difference AF is hardly performed by an imaging element with phase-difference detection function.

A first embodiment of the present invention is an image pickup apparatus that includes: a drive control section controlling driving of a focus lens from a first position to a second position in a photographic optical system; an imaging element having a first pixel group realizing a pupil-dividing function by receiving light fluxes from a subject passing through a pair of portion areas oppositely biased from each other in a predetermined direction on an exit pupil in the photographic optical system and a second pixel group without the pupil-dividing function; and a focus control section driving the focus lens toward an in-focus position detected by focus detection of a phase-difference detection system from a pixel signal of the first pixel group. In this image pickup apparatus, the section controlling focusing includes: a focus-direction detecting section, a determination section, a first control section, and a second control section. Here, the focus-direction detecting section is provided for detecting the in-focus position by making a comparison between first information and second information, where the first information is obtained as focus detection information to be used for focus detection of a contrast detection system based on a pixel signal generated from the second pixel group when the focus lens is located at the first position, and the second information is obtained as the focus detection information based on a pixel signal generated from the second pixel group when the focus lens is located at the second position. The determination section is provided for determining reliability of detecting the in-focus position depending on whether or not the pixel signal from the first pixel group satisfies a predetermined condition. The first control section is provided for driving the focus lens toward an in-focus position detected based on the pixel signal from the first pixel group when the determination section determines that the pixel signal from the first pixel group satisfies the predetermined condition and the reliability is high. The second control section is provided for driving the focus lens toward an in-focus position detected by the focus-direction detecting section when the determination section determines that the pixel signal from the first pixel group does not satisfy the predetermined condition and the reliability is low.

A second embodiment of the present invention is a focus control method that includes the steps of: controlling driving of a focus lens from a first position to a second position in a photographic optical system (step of drive control); and receiving light fluxes from a subject passing through a pair of portion areas oppositely biased from each other in a predetermined direction on an exit pupil in the photographic optical system, and then driving the focus lens toward an in-focus position detected by focus detection of a phase-difference detection system from a pixel signal from a first pixel group of an imaging element that realizes a pupil-dividing function (step of focus control). In this method, the step of focus control includes the substeps detecting the in-focus position by making a comparison between first information and second information, where the first information is obtained as focus detection information to be used for focus detection of a contrast detection system based on a pixel signal generated from the second pixel group of the imaging element without the pupil-dividing function when the focus lens is located on the first position, and the second information is obtained as the focus detection information based on a pixel signal generated from the second pixel group when the focus lens is located at the second position (substep of in-focus direction detection); determining reliability of detecting the in-focus position depending on whether or not the pixel signal from the first pixel group satisfies a predetermined condition (substep of determination); driving the focus lens toward an in-focus position detected based on the pixel signal from the first pixel group when the determination means determines that the pixel signal from the first pixel group satisfies the predetermined condition and the reliability is high (substep of first control); and driving the focus lens toward an in-focus position detected by the substep of in-focus direction detection when the substep of determination determines that the pixel signal from the first pixel group does not satisfy the predetermined condition and the reliability is low (substep of second control).

According to any embodiment of the present invention, a first pixel group is provided for realizing a pupil-dividing function by receiving light fluxes from a subject passing through a pair of portion areas oppositely biased from each other in a predetermined direction on an exit pupil in the photographic optical system. In addition, a second pixel group without the pupil-dividing function is also provided. If it is determined that the pixel signal from the first pixel group satisfies a predetermined condition and the reliability of the detection of in-focus position is high, a focus lens is driven toward an in-focus position detected by focus detection of a phase-difference detection system based on a pixel signal of the first pixel group. On the other hand, if it is determined that the pixel signal from the first pixel group does not satisfy the predetermined condition and the reliability of the detection of in-focus position is low, the focus lens is driven in the direction of an in-focus position detected by making a comparison between the first information and the second information obtained as focus detection information used for focus detection with a contrast detection system on the basis of a pixel signal generated from the second pixel group when the focus lens is located on each of the first position and the second position. As a result, even when the phase difference AF is hardly operated by the imaging element with phase-difference detection function, a suitable focus control can be performed.

DESCRIPTION OF THE PREFERRED EMBODIMENTS

[External Configuration of Image Pickup Apparatus]

Figure 1:
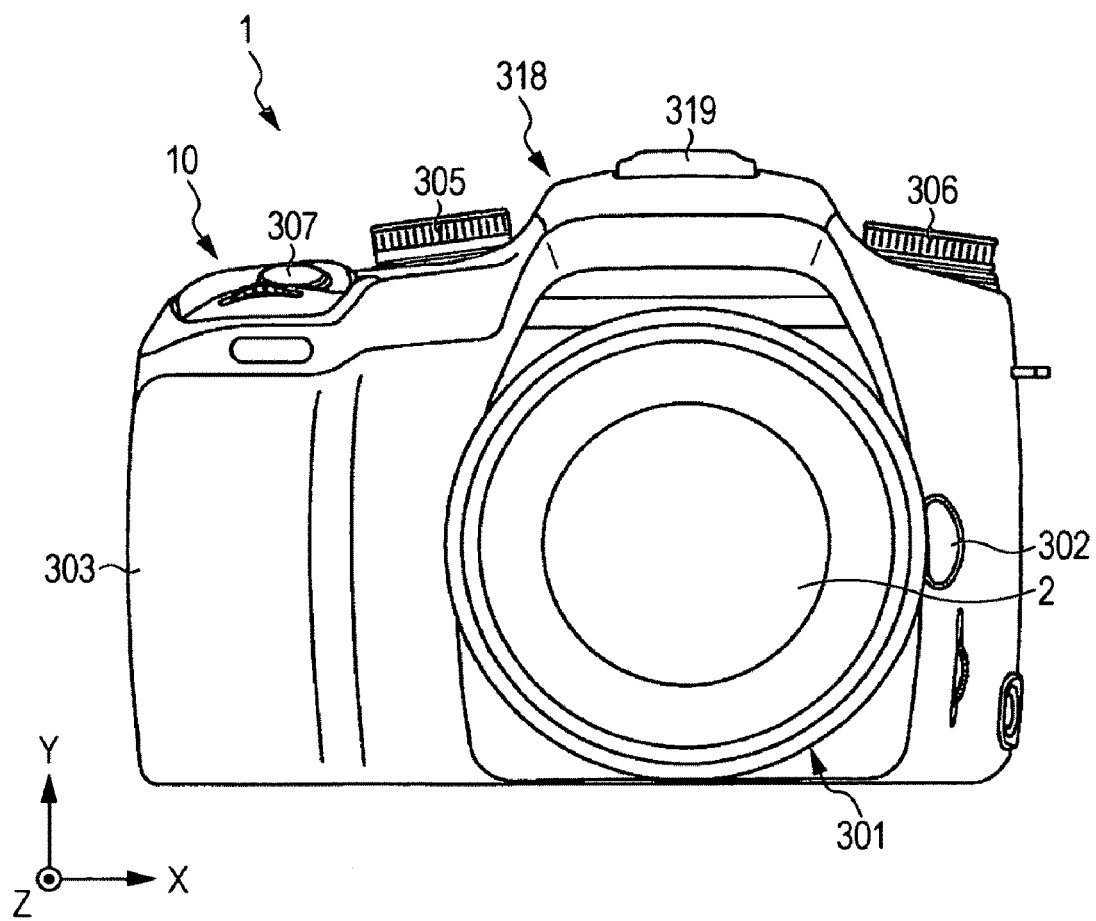
FIG. 1 is a diagram illustrating an external configuration of an image pickup apparatus according to an embodiment of the present invention.
Figure 2:
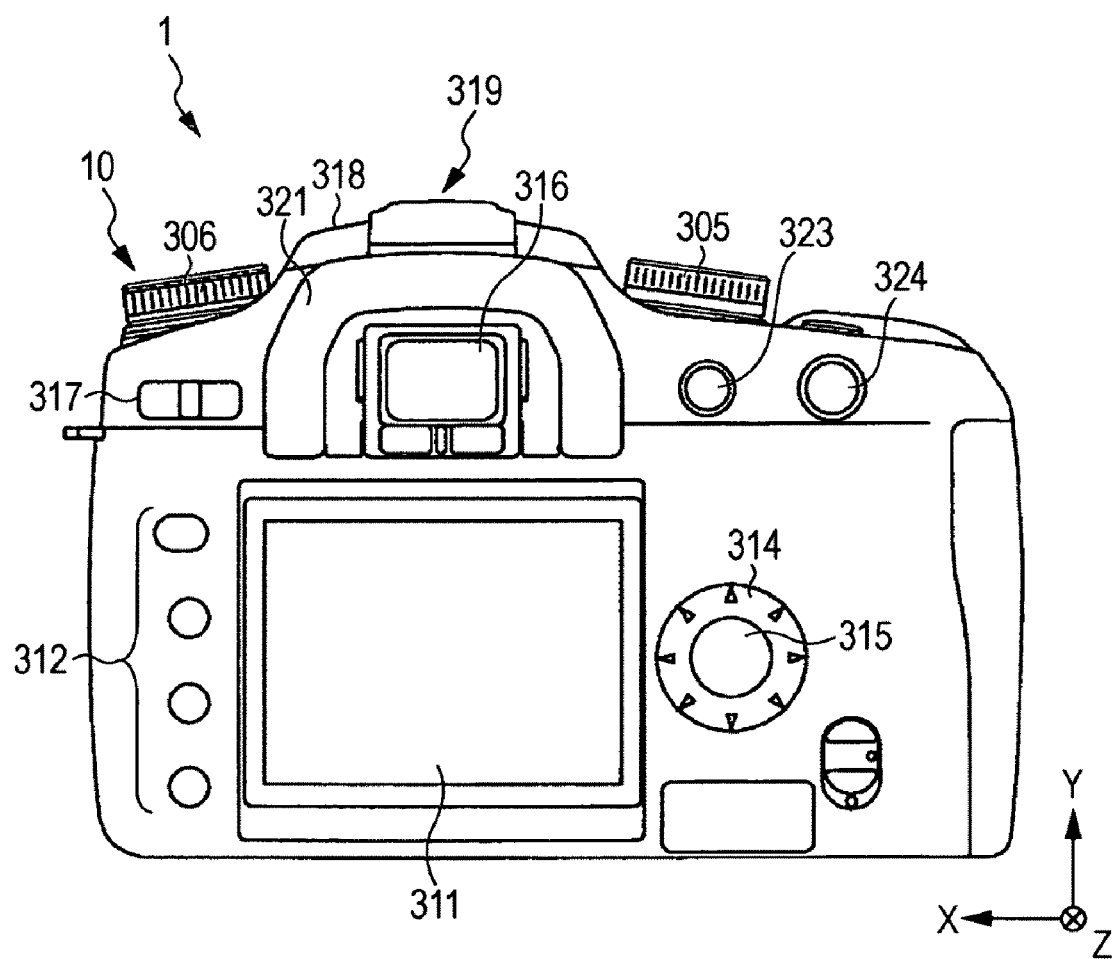
FIG. 2 is a diagram illustrating an external configuration of the image pickup apparatus according to the embodiment of the present invention.
Figure 3:
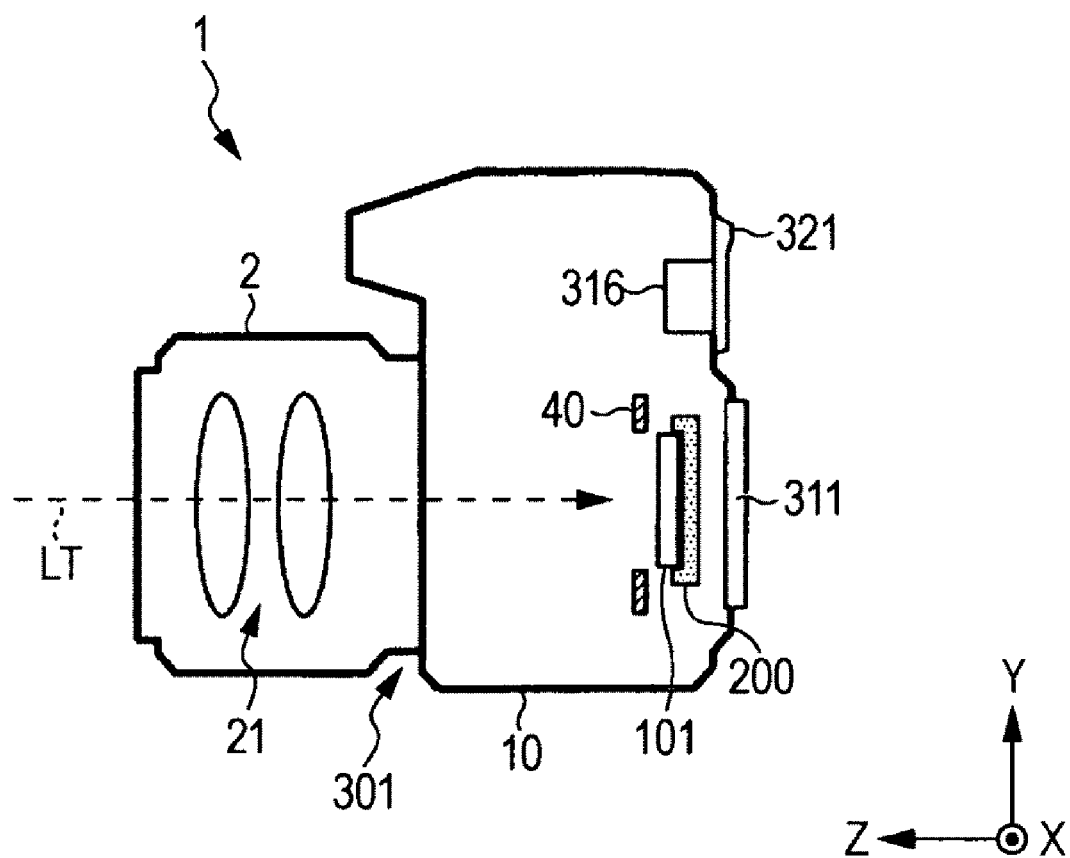
FIG. 3 is a longitudinal cross-sectional view of the image pickup apparatus.

FIG. 1 and FIG. 2 are diagrams showing an external configuration of an image pickup apparatus 1 according to a first embodiment of the present invention. Here, FIG. 1 is a front view and FIG. 2 is a rear view of the image pickup apparatus 1. In addition, a vertical cross-sectional view of the image pickup apparatus 1 is illustrated in FIG. 3.

In this embodiment, for example, the image pickup apparatus 1 may be a digital SLR still camera. The image pickup apparatus 1 includes a camera body 10 and a photographic lens 2 serving as an interchangeable lens removably attached to the camera body 10.

In FIG. 1, on the front side of the camera body 1, there are a mount portion 301 to which the photographic lens 2 is attached; a lens replacement button 302 arranged on the right-lateral side of the mount portion 301; and a grip portion 303 protruded from the front left end portion (the left side in the X direction) to allow a user to securely hold the camera body 10 by one hand (or both hands). In addition, the camera body 10 is provided with a mode setting dial 305 on the upper left front portion (upper left side in the Y direction), a control value setting dial 306 on the upper right front portion, and a shatter button 307 on the upper surface of the grip portion 303.

In FIG. 2, a liquid crystal display (LCD) 311, setting buttons 312, a cross-key selector 314, and a push button 315 are provided on a rear surface of the camera body 10. The setting buttons 312 are located on the left side of the LCD 311, and the cross-key selector 314 is located on the right side of the LCD 311. The push button 315 is located at the center of the cross-key selector 314. Furthermore, on the rear surface of the camera body 10, an electronic viewfinder (EVF) 316, an eye cup 321, a main switch 317, an exposure correction button 323, an Auto Exposure (AE) lock button 324, a flash unit 318, and a connection terminal portion 319 are further provided. The EVF 316 is disposed at an upper position with respect to the LCD 311. The eye cup 321 is formed around the EVF 316. The main switch 317 is disposed on the left side of the EVF 316. The exposure correction button 323 and the AE lock button 324 are disposed on the right side of the EVF 316. The flash unit 318 and the connection terminal portion 319 are located in an upper portion of the EVF 316.

The mount portion 301 is provided with a plurality of electrical contacts for electrical connection with the attached photographic lens 2, a coupler for mechanical connection, and so on.

The lens replacement button 302 is a button which is pressed to remove the photographic lens 2 attached to the mount portion 301. The grip portion 303 is a portion with which a user holds the image pickup apparatus 1 during a shooting operation, and has finger-shaped contours for a more fitting experience. The battery storage room and the card storage room (un-illustrating) are established in the inside of grip part 303. The battery receiving chamber is designed to receive a battery 69B (see FIG. 4) serving as a camera power source, and the card receiving chamber is designed to removably receive a recording medium, a memory card 67 (see FIG. 4), to record image data of photographed images onto the memory card 67. The grip portion 303 may be provided with a grip sensor configured to detect whether or not a user holds the grip portion 303.

Each of the mode setting dial 305 and the control value setting dial 306 is formed of a substantially disk-shaped member rotatable in a plane substantially parallel to the top surface of the camera body 10. The mode setting dial 305 is operable to select one of modes or functions provided in the image pickup apparatus 1, such as an Auto Exposure (AE) control mode, an Auto Focus (AF) control mode, various shooting modes such as a still-image shooting mode for shooting a still image and a continuous shooting mode for continuously shooting images, and a reproduction mode for reproducing a recorded image. On the other hand, the control value setting dial 306 is arranged to set a control value for each of the functions provided in the image pickup apparatus 1.

The shutter button 307 is a pressing switch which can be pressed halfway ("half-pressed") and which can further be pressed ("fully pressed"). In the still-image shooting mode, when the shutter button 307 is half-pressed (S1), a pre-shooting operation before shooting a still image of a subject (a pre-shooting operation including setting of an exposure control value and focus adjustment or focusing) is executed. Then, when the shutter button 307 is fully pressed (S2), a shooting operation (a series of operations of exposing an imaging element 101 (see FIG. 3) to light, applying predetermined image processing to an image signal obtained by the exposure, and recording the resulting image signal onto a recording medium such as a memory card) is executed.

The LCD 311 includes a color liquid crystal panel capable of displaying an image. The LCD 311 is configured to display an image captured by the imaging element 101 (see FIG. 3) or to reproduce and display a recorded image, and is also configured to display a setting screen for setting the functions or modes provided in the image pickup apparatus 1.

It replaces with LCD 311 and may be made to use organic electroluminescence and a plasma display. The setting buttons 312 are buttons which are operated to perform the functions provided in the image pickup apparatus 1. Examples of the setting buttons 312 include a selection setting switch for setting an item selected on a menu screen displayed on the LCD 311, a selection cancellation switch, a menu display switch for switching the display on the menu screen, a display on/off switch, and a display magnification switch. The cross key sector 314 has an annular member provided with a plurality of pressing parts (portions marked by triangles in the figure) arranged with constant intervals in the circumferential direction. The cross key sector 314 is constituted so that the pressing operation of a pressing part will be detected by a contact point, a switch (not shown), that corresponds to each pressing part. The push button 315 is located at the center of the cross-key selector 314. The cross-key selector 314 and the push button 315 are operable to enter instructions, such as an instruction to change the shooting magnification to move a zoom lens 212 in a wide-angle (wide) direction or a telephoto (tele) direction, an instruction to set the frame advance feature for advancing frame-by-frame a recorded image to be reproduced on the LCD 311, and an instruction to set shooting conditions (such as the aperture value, the shutter speed, and the turning on or off of flash light).

The EVF 316 includes, for example, a color liquid crystal panel (not shown) which can display an image. The EVF 316 is configured to display an image captured by the imaging element 101 (see FIG. 3) or to reproduce and display a recorded image. Prior to actual shooting (shooting for image recording), live-view (preview) display is provided so that a subject can appear on the EVF 316 or the LCD 311 in a movie form on the basis of image signals sequentially generated by the imaging element 101. This allows a user to visually check the subject to be actually photographed by the imaging element 101. The main switch 317 is formed of a two-contact slide switch slidable to the right and left. When the main switch 317 is set to the right in FIG. 2, the image pickup apparatus 1 is powered on. When the main switch 317 is set to the left, the image pickup apparatus 1 is powered off.

The flash unit 318 is formed as a pop-up built-in flashlight. An external flashlight or the like may be attached to the camera body 10 using the connection terminal portion 319.

The eye cup 321 is a substantially C-shaped light-shielding member having light-shielding properties and capable of blocking external light from entering the EVF 316.

The exposure correction button 323 is a button for manually adjusting the exposure value (aperture value or shutter speed). The AE lock button 324 is a button for fixing the exposure.

The photographic lens 2 serves as a lens window through which light (optical image) coming from the subject is received, and also serves as a photographic optical system for directing the subject light into the imaging element 101 provided in the camera body 10. The photographic lens 211 can be removed from the camera body 10 by pressing the lens replacement button 302 described above.

The photographic lens 2 includes a lens group 21 having a plurality of lenses arranged in series along an optical axis LT (see FIG. 3). The lens group 21 includes a focus lens 211 (see FIG. 4) configured to perform focus adjustment, and the zoom lens 212 (see FIG. 4) configured to perform variable magnification. The focus lens 211 and the zoom lens 212 are driven in the direction of the optical axis LT (see FIG. 3) to perform focus adjustment and variable magnification, respectively. The photographic lens 2 further includes an operating ring at an appropriate position on an outer circumference of a barrel of the photographic lens 2 so as to be rotatable along the outer circumferential surface of the barrel. In response to a manual operation or an automatic operation, the zoom lens 212 moves in the direction of the optical axis LT depending on the direction of rotation and the amount of rotation of the operating ring, and is set to a zoom magnification (shooting magnification) corresponding to the position to which the zoom lens 212 moves.

The imaging element 101 is arranged in the direction perpendicular to the optical axis LT of the lens group 21 that constitutes the photographic lens 2 when the photographic lens is attached to the camera body 10. The image element 101 may be a complementary metal-oxide semiconductor (CMOS) color area sensor (CMOS imaging element) where, for example, a plurality of pixels having photodiodes is two-dimensionally arranged in a matrix and the respective pixels are provided with red (R), green (G), and blue (B) color filters having different spectral characteristics. The imaging element (imaging sensor) 101 generates analog electrical signals (image signals) of red (R), green (G), and blue (B) color components regarding a subject optical image formed through the photographic lens (photographic optical system)

2, and outputs them as R, G, and B color image signals. The details of the configuration of this imaging element 101 will be described later.

The imaging element 101 is held on an image element driving mechanism 200 movably in two dimensional directions on the plane perpendicular to the optical axis L. A shutter unit is placed in front of the imaging element 101 in the optical axis direction. The shutter unit 40 includes a curtain (not shown) that moves up and down and is formed as a mechanical focal plane shutter configured to perform an optical path opening operation and optical path blocking operation of the subject light directed toward the imaging element 101 along the optical axis L. If the imaging element 101 is an imaging element that can be completely electronically shuttered, the shutter unit 40 may be omitted.

[Electrical Configuration of Image Pickup Apparatus 1]

Figure 4:
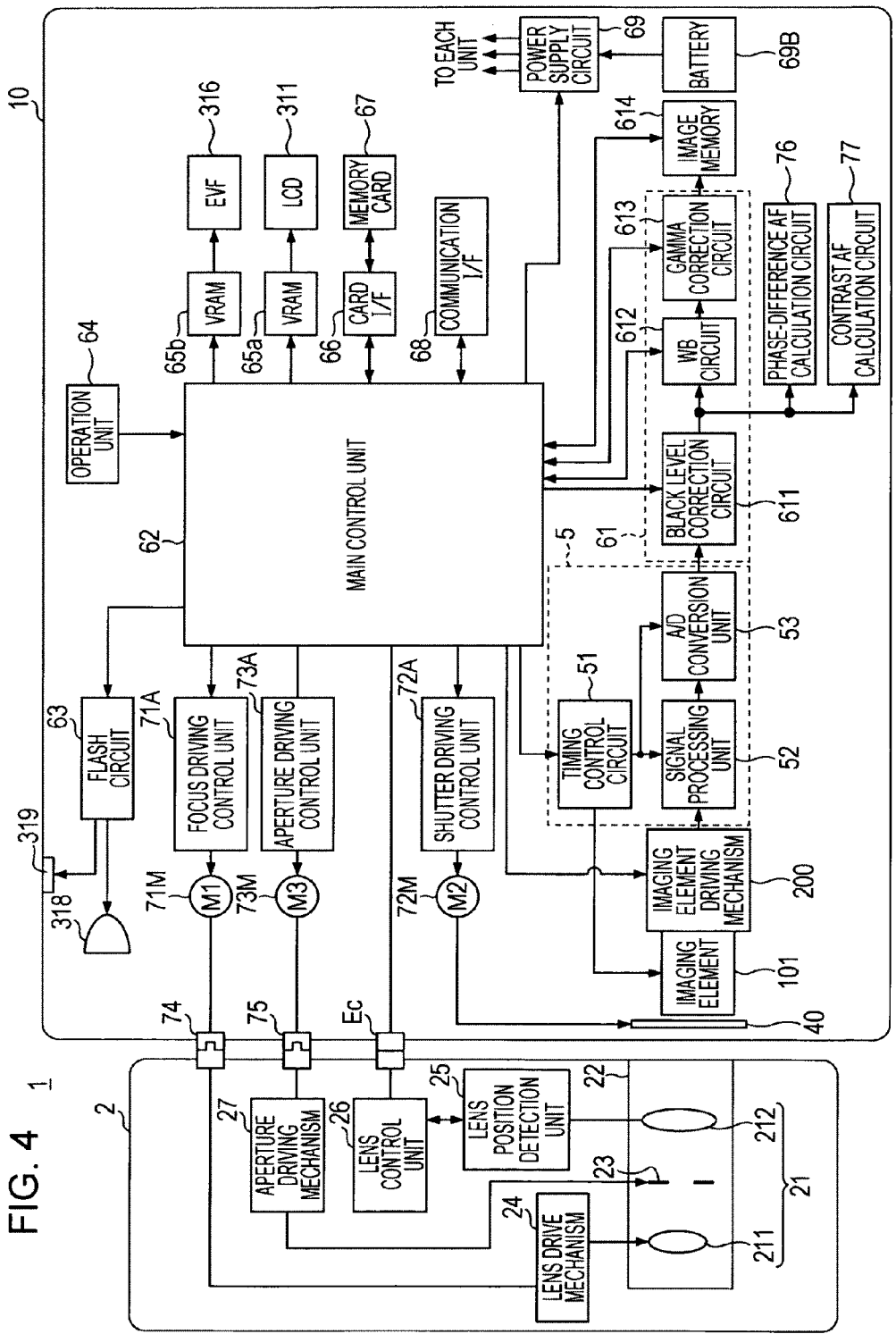
FIG. 4 is a block diagram illustrating an electrical configuration of the image pickup apparatus.

FIG. 4 is a block diagram illustrating an electrical configuration of the entire image pickup apparatus 1. In FIG. 4, members that are the same as or similar to those shown in FIGS. 1 to 3 are assigned the same reference numerals. For the convenience of description, the electrical configuration of the photographic lens 2 will be described first.

The photographic lens 2 includes, in addition to the lens group 21 forming the photographic optical system described above, a lens driving mechanism 24, a lens position detection unit 25, a lens control unit 26, and an aperture driving mechanism 27.

In the lens group 21, the focus lens 211, the zoom lens 212, and an aperture 23 configured to adjust the amount of light incident on the imaging element 101 in the camera body 10 are held in the direction of the optical axis LT (see FIG. 3) within the barrel. Thus, an optical image of the subject is received and formed on the imaging element 101. Focusing operation is performed such that an AF actuator 71M in the camera body 10 drives the lens group 21 in the direction of the optical axis LT.

The lens driving mechanism 24 includes, for example, a helicoid and a gear (not shown) that causes the helicoid to rotate. In response to a driving force received from the AF actuator 71M through a coupler 74, the lens driving mechanism 24 drives the focus lens 211 or any other suitable component in a direction parallel to the optical axis LT. The direction of movement and the amount of movement of the focus lens 211 are determined according to the direction of rotation and the rotational speed of the AF actuator 71M, respectively.

The lens position detection unit 25 includes an encoder plate and an encoder brush. The encoder plate has a plurality of code patterns defined at predetermined pitches in the direction of the optical axis LT within a movable range of the lens group 21. The encoder brush moves along with the barrel 22 in slidable contact with the encoder plate. The lens position detection unit 25 is configured to detect the amount of movement of the lens group 21 during focus control. A lens position detected by the lens position detection unit 25 is output as, for example, the number of pulses.

The lens control unit 26 includes, for example, a microcomputer having a built-in memory (not shown) such as a read-only memory (ROM) that stores a control program or a flash memory that stores data regarding status information.

The lens control unit 26 has a communication function of performing communication with the main control unit 62 of the camera body 10 through a connector Ec. For example, the status information data of the lens group 21, such as the focal length, the exit pupil position, the aperture value, the in-focus distance, and the amount of ambient light, can be transmitted to the main control unit 62. Moreover, for example, data regarding the amount of driving of the focus lens 211 can be received from the main control unit 62. At the time of shooting, furthermore, the data of the focal length information about the photographic lens 2, the position of the focus lens 211, the aperture value, and so on can be transmitted to main control unit 62.

The aperture driving mechanism 27 is configured to change the aperture diameter of the aperture 23 in response to a driving force received from an aperture driving actuator 73M through the coupler 75.

Next, an electrical configuration of the camera body will be described. The camera body 10 includes, in addition to the components described above, such as the imaging element 101 and the shutter unit 40, an analog front end (AFE) 5, an image processing unit 61, an image memory 614, the main control unit 62, a flash circuit 63, an operation unit 64, video random access memories (VRAMs) 65 (65a and 65b), a card interface (I/F) 66, a memory card 67, a communication I/F 68, a power supply circuit 69, a battery 69B, a focus driving control unit 71A, an AF actuator 71M, a shutter driving control unit 72A, a shutter driving actuator 72M, an aperture driving control unit 73A, and an aperture driving actuator 73M.

As described above, the imaging element 101 is formed of a CMOS sensor. A timing control circuit 51, described below, controls an imaging operation such as the start (and end) of the exposure operation of the imaging element 101, the output selection of individual pixels included in the imaging element 101, and the reading of pixel signals.

The AFE 5 is configured to supply timing pulses to the imaging element 101 to perform a predetermined operation, and to apply predetermined signal processing to image signals output from the imaging element 101 (a group of analog signals corresponding to beams of light received by the individual pixels of the CMOS area sensor) to convert them into digital signals, which are then output to the image processing unit 61. The AFE 5 includes the timing control circuit 51, a signal processing unit 52, and an analog-to-digital (A/D) conversion unit 53.

The timing control circuit 51 generates predetermined timing pulses (such as a vertical scanning pulse φVn, a horizontal scanning pulse φVm, and a pulse for generating a reset signal φVr) on the basis of a reference clock signal output from the main control unit 62, and outputs them to the imaging element 101 to control the imaging operation of the imaging element 101. By outputting the predetermined timing pulses to the signal processing unit 52 and the A/D conversion unit 53, the operation of the signal processing unit 52 and the A/D conversion unit 53 is controlled.

The signal processing unit 52 is configured to apply predetermined analog signal processing to analog image signals output from the imaging element 101. The signal processing unit 52 includes a correlated double sampling (CDS) circuit, an automatic gain control (AGC) circuit that amplifies a charge signal from the imaging element 101, and a clamp circuit.

In the AGC circuit of the signal processing unit 52, charge signals (pixel signals) from the respective pixels (G pixels 11gb, R pixels 11r, and B pixels 11b) generally arranged on pixel lines Ln described later are amplified with a gain (amplification factor) of $\alpha$. In addition, charge signals from the respective pixels along an AF line Lf described later are amplified with gain of $\beta$ ($\beta > \alpha$). In the pixels for phase difference AF, which receive the light flux passed through part of the exit pupil of the photographic lens 2, the sensitivities thereof will fall compared with the usual pixels for photography. Therefore, it is necessary to amplify the signals with a gain higher than the usual to secure a proper output level.

The A/D conversion unit 53 is configured to convert analog R, G, and B image signals output from the signal processing unit 52 into digital image signals having a plurality of bits (for example, 12 bits) on the basis of timing pulses output from the timing control circuit 51. The image processing unit 61 is configured to perform predetermined signal processing on image data output from the AFE 5 to create an image file. The image processing unit 61 includes a black level correction circuit 611, a white balance control circuit 612, and a gamma correction circuit 613. The image data which the image data taken into image processing unit 61 is once written in image memory 614 synchronizing with read-out of the imaging element 101. Subsequently, the image data written in this image memory 614 is accessed and then processed in each block of the image processing unit 61.

The black level correction circuit 611 is configured to correct the black level of the A/D converted digital R, G, and B image signals obtained by the A/D conversion unit 53 into a reference black level.

The white balance control circuit 612 is configured to perform level conversion (white balance (WB) adjustment) of the digital signals of the red (R), green (G), and blue (B) color components on the basis of reference white in accordance with a light source. That is, based on WB adjustment data supplied from the main control unit 62, the white balance control circuit 612 specifies a portion that is estimated to be a white portion in the photographed subject from the luminance or chroma data. Then the white balance control circuit 612 determines a mean of the R, G, and B color components in the specified portion, as well as a G/R ratio and a G/B ratio. The mean, the G/R ratio, and the G/B ratio are used as R and B correction gains to perform level correction.

The gamma correction circuit 613 is configured to correct grayscale characteristics of the WB-adjusted image data. Specifically, the gamma correction circuit 613 performs non-linear transformation on the levels of the image data using a gamma correction table that is set in advance for each of the color components, and also performs offset adjustment.

The image memory 614 is a memory that, in a shooting mode, temporarily stores image data output from the image processing unit 61 and that is used by the main control unit as a work area for performing a predetermined process on the image data. In a reproduction mode, the image memory 614 temporarily stores image data read from the memory card 67.

The main control unit 62 includes, for example, a microcomputer having a built-in storage unit such as a ROM that stores a control program or a flash memory that temporarily stores data, and is configured to control the operation of individual components of the image pickup apparatus 1.

In addition, the main control unit 62 determines the direction of shaking and the amount of shaking on the basis of a shaking detection signal from a shaking detection sensor (not shown) when a hand-shake correction mode is performed.

Based on the determined direction and amount of shaking, the main control unit 62 generates and outputs a shake-correction control signal to the image element driving mechanism 200. Then, the imaging element 101 is driven by the imaging element driving mechanism 200 and moved in the direction of canceling the hand shaking.

The flash circuit 63 is configured to, in a flash shooting mode, control the amount of light emitted from the flash unit 318 or an external flashlight connected to the connection terminal portion 319 to an amount of light designated by the main control unit 62.

The operation unit 64 includes the mode setting dial 305, the control value setting dial 306, the shutter button 307, the setting buttons 312, the cross-key selector 314, the push button 315, and the main switch 317, described above, and is configured to input operation information to the main control unit 62.

The VRAMs 65a and 65b are buffer memories having a storage capacity of image signals corresponding to the number of pixels of the LCD 311 and the EVF 316, respectively, and are provided between the main control unit 62 and the LCD 311 and between the main control unit 62 and the EVF 316, respectively. The card I/F 66 is an interface that allows transmission and reception of signals between the memory card and the main control unit 62. The memory card 67 is a recording medium on which image data generated by the main control unit 62 is stored. The communication I/F 68 is an interface configured to allow transmission of image data and other suitable data to a personal computer or any other suitable external device.

The power supply circuit 69 is formed of, for example, a constant voltage circuit, and generates a voltage for driving the overall image pickup apparatus 1 including a control unit, such as the main control unit 62, the imaging element 101, and various other driving units. The imaging element 101 is energized under control of a control signal supplied from the main control unit 62 to the power supply circuit 69. The battery 69B includes a primary battery such as an alkaline battery and a secondary battery such as a nickel metal-hydride rechargeable battery, and serves as a power source that supplies power to the overall image pickup apparatus 1.

Focus driving control unit 71A is configured to generate a drive control signal for the AF actuator 71M, which is used for moving the focus lens 211 to an in-focus position, on the basis of an AF control signal supplied from the main control unit 62. The AF actuator 71M includes a stepping motor and provides the lens driving mechanism 24 of the photographic lens 2 with a lens-driving force through the coupler 74. The AF actuator 71M may be installed in the interchangeable photographic lens 2 in stead of in the camera body 10.

The shutter driving control unit 72A is configured to generate a drive control signal for the shutter driving actuator 72M on the basis of a control signal supplied from the main control unit 62. The shutter driving actuator 72M is an actuator that drives the shutter unit 40 to open and close.

The aperture driving control unit 73A is configured to generate a drive control signal for the aperture driving actuator 73M on the basis of a control signal supplied from the main control unit 62. The aperture driving actuator 73M applies a driving force to the aperture driving mechanism 27 through the coupler 75.

The camera body 10 further includes a phase difference AF calculation circuit 76 and a contrast AF calculation circuit 77 that perform calculations used for the autofocus (AF) control on the basis of the black-level-corrected image data output from the black level correction circuit 611.

Hereinafter, the AF operation of the image pickup apparatus 1 and the configuration of the imaging element 101 using the phase difference AF calculation circuit 76 and the contrast AF calculation circuit 77 will be described in detail.

[Configuration of Imaging Element 101 and AF Operation of Image Pickup Apparatus 1]

The image pickup apparatus 1 is configured to perform phase difference AF in which transmitted light beams transmitted (passing) through different portions of an exit pupil are received by the imaging element 101. The configuration of the imaging element 101 and the principle of phase difference AF using the imaging element 101 will now be described.

Figure 5:
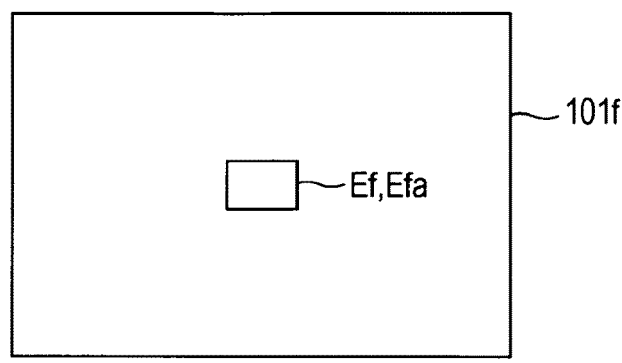
FIG. 5 is a schematic diagram illustrating the configuration of an imaging element.
Figure 6:
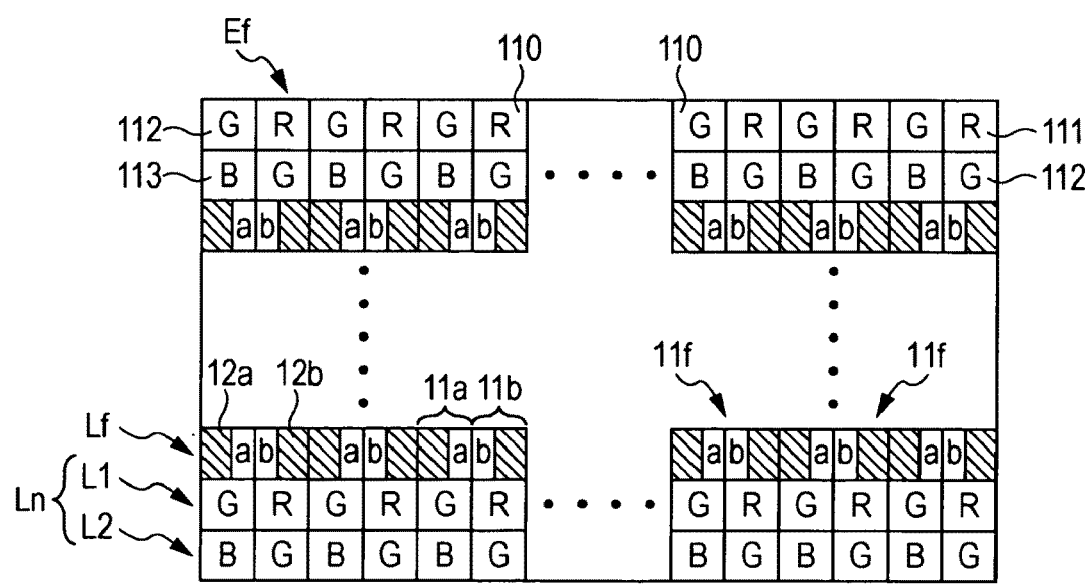
FIG. 6 is a schematic diagram illustrating the configuration of the imaging element.

FIGS. 5 and 6 are diagrams illustrating the configuration of the imaging element 101.

The imaging element 101 is configured to perform a distance measurement by focus detection with a phase difference detection system in an AF area (focus detection area) Ef (Efa) specified in the center of an imaging surface 101*f* (see FIG. 5).

Figure 7:
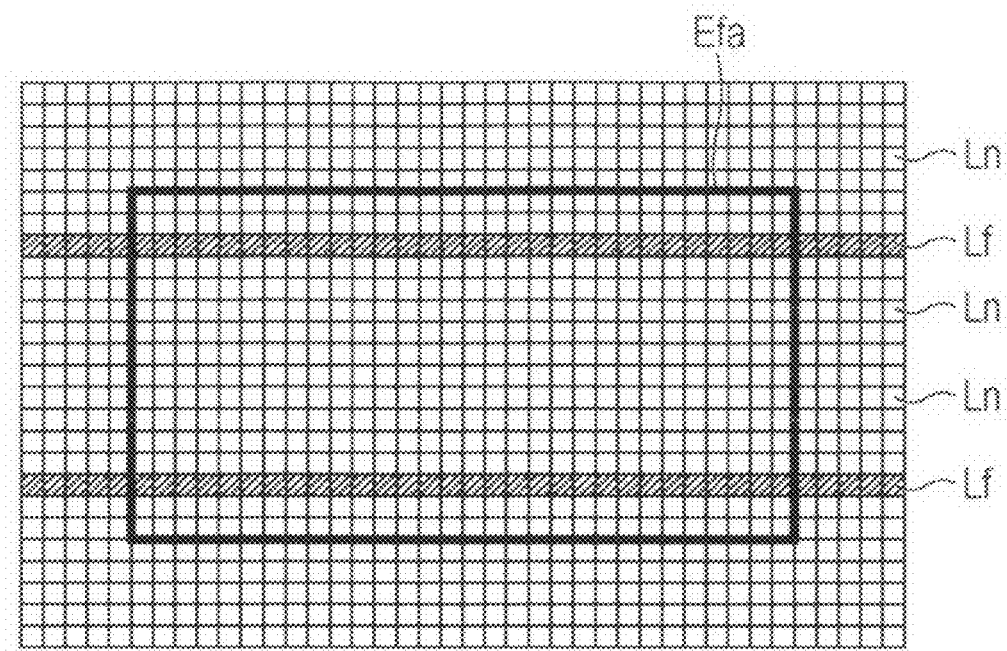
FIG. 7 is a schematic diagram illustrating the configuration of the imaging element.

Specifically, as shown in FIG. 7 that represents pixels on the outer and inner sides of the AF area Efa, AF lines Lf (shaded portions) are horizontally formed on the imaging element 101 and have a pupil-dividing function to carry out the phase difference AF (the details thereof will be described later). A distance measurement with respect to a subject can be performed in the AF area Efa defined as a region containing the partial sections of the respective AF lines Lf.

Referring back to FIG. 6, the AF area Ef will be described in detail.

The AF area Ef, includes a group of normal pixels (second pixel group) having no pupil-dividing function and constructed of R pixels 111, G pixels 112, and B pixels 113 configured such that red (R), green (G), and blue (B) color filters are disposed on photodiodes (hereinafter, such pixels will be simply referred to as "normal pixels"). In addition, the AF area Ef includes a pixel-pair group 11*f* for carrying out the phase difference AF, having light-shielding plates 12*a* and 12*b* (shaded portions) described later (hereinafter, simply referred to as an "AF pixel pair").

The AF area Ef includes a Gr line L1 in which G pixels 112 and R pixels 111 are alternately arranged in the horizontal direction and a Gb line L2 in which B pixels 113 and G pixels 112 are alternately arranged in the horizontal direction. Both the Gr line L1 and the Gb line L2 form horizontal lines of normal pixels 110 (normal pixel lines), respectively. The Gr lines L1 and Gb lines L2 are alternately arranged in the vertical direction to form the Bayer arrangement.

Furthermore, in the AF area Ef, the AF lines (focus detection pixel rows) Lf are formed such that the AF pixel pairs 11*f* are horizontally arranged in rows. The AF lines Lf are next to each other in the vertical direction and periodically formed in the vertical direction such that, as shown in FIG. 7, 10 normal pixel lines Ln are sandwiched between the AF lines Lf.

Figure 8:
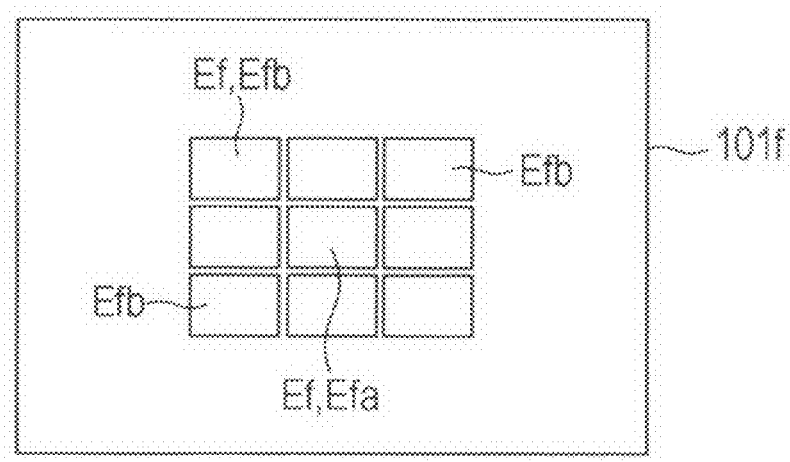
FIG. 8 is a schematic diagram illustrating a multi-area on the imaging element.

In the image pickup apparatus 1 of the present embodiment, in addition to the AF area Efa, eight AF areas Efb each having a group of AF pixel pairs 11*f* and a group of normal pixels 110 may be further constructed around the AF area Efa (see FIG. 8). Thus, when nine AF areas (focus detection areas) Ef are defined on the imaging surface 101*f*, for example, focus control by the phase difference AF will be performed on one AF area Ef automatically selected by the main control unit 62. Here, an AF mode in which one AF area (hereinafter, also referred to as a "single area") Ef as shown in FIG. 5 and another AF mode in which nine AF areas (hereinafter, also referred to as a "multi-area") Ef as shown in FIG. 8 can be specified by user input on the setting screen displayed, for example, on the LCD 311.

Next, the principle of phase difference AF using the AF lines will be described in detail.

Figure 9:
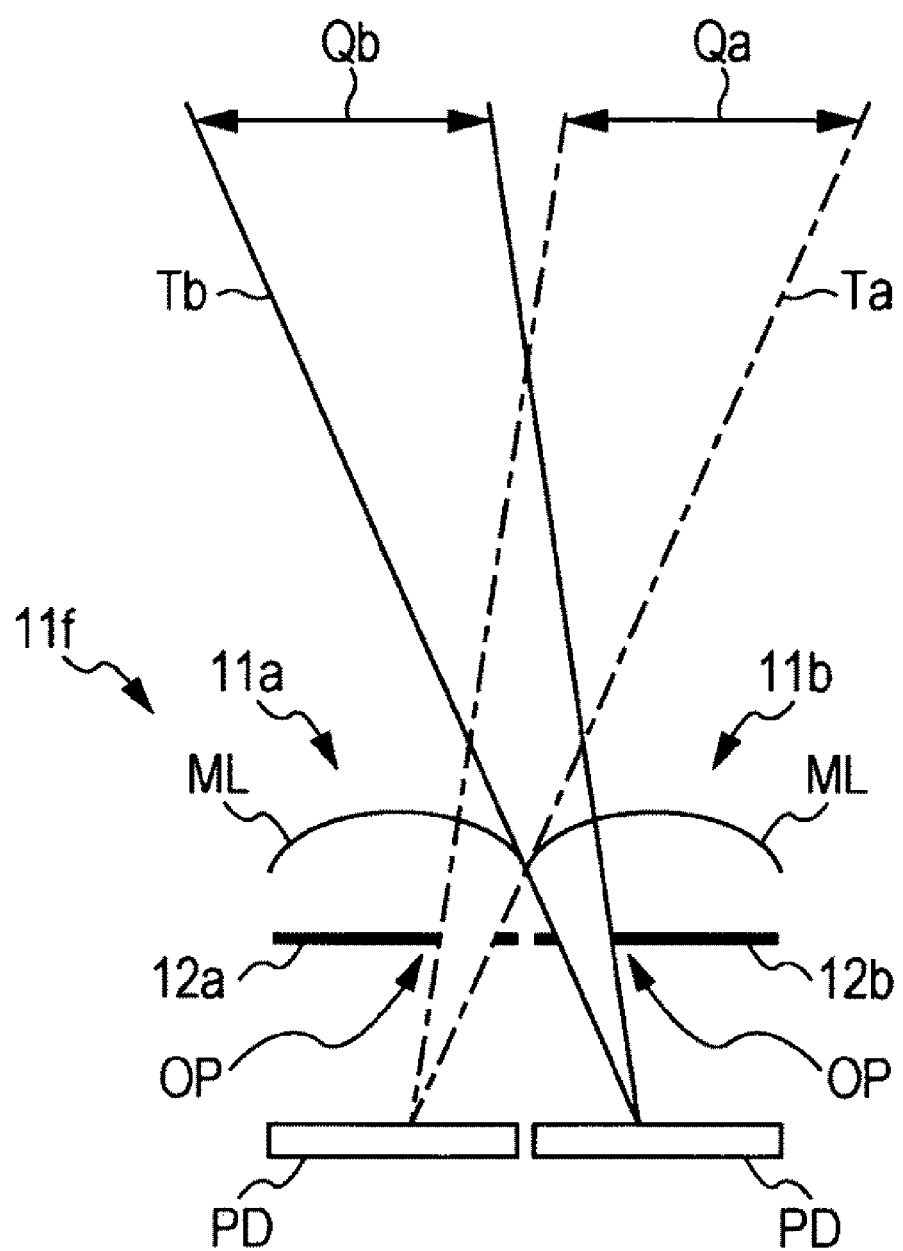
FIG. 9 is a schematic diagram illustrating a principle of a phase difference AF using an AF line.

FIG. 9 is a diagram illustrating the principle of the phase difference AF using the AF lines Lf.

Two or more sets of pixels 11*a* and 11*b* having the light-shielding plates 12*a* and 12*b* are horizontally arranged on the AF line Lf so that the opening OP of the light-shielding plate 12*a* and the opening OP of the light-shielding plate 12*b* are formed in mirror symmetry with respect to each other. The openings OP are responsible for separating light flux Ta from the right side portion Qa of the exit pupil and light flux Tb from the left side portion Qb thereof of the interchangeable lens 2. In other words, the pixel 11*a* has the light-shielding plate 12*a* in which a slit-shaped opening OP is biased to the right side with respect to the photoelectric conversion part (photodiode) PD directly below the plate 12*a* (hereinafter, such a pixel is also referred to as a "first AF pixel"). Also, the pixel 11*b* has the light-shielding plate 12*b* in which a slit-shaped opening OP is biased to the left side with respect to the photoelectric conversion part (photodiode) PD directly below the plate 12*b* (hereinafter, such a pixel is also referred to as a "second AF pixel"). The pixels 11*a* and the pixels 11*b* are alternately arranged on the AF line Lf (see FIG. 6). Therefore, the photoelectric conversion part PD of the first AF pixel 11*a* receives the light flux Ta from the right side portion Qa of the exit pupil, passing through a microlens ML and the opening OP of the light-shielding plate 12*a*. Also, the photoelectric conversion part PF of the second AF pixel 11*b* receives the light flux Tb from the left side portion Qb of the exit pupil, passing through a microlens ML and the opening OP of the light-shielding plate 12*b*. In other words, the AF pixel pair 11*f* constructed of the first AF pixel 11*a* and the second AF pixel 11*b* is allowed to receive the light fluxes Ta and Tb from a subject passing through the right and left side portions (a pair of portion areas) Qa and Qb horizontally arranged on the opposite sides of the exit pupil of the interchangeable lens 2. Therefore, a pupil-dividing function can be realized by the AF line LF constructed of a group of such AF pixel pairs 11*f* (first pixel group).

Hereinafter, the pixel output of the first AF pixel 11*a* is referred to as an "A-type pixel output", and the pixel output of the second AF pixel 11*b* is referred to as a "B-type pixel output". Referring now to FIGS. 10 to 16, for example, the relationship between the A-type pixel output and the B-type pixel output, which are obtained from the pixel arrangement of the AF pixel pairs 11*f* on one of the AF lines Lf will be described.

Figure 10:
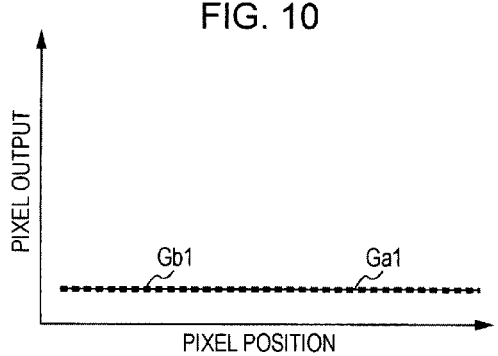
FIG. 10 is a graphic diagram conceptually illustrating a case of when a focal plane is defocused by 10 mm advancing close to an imaging surface.
Figure 11:
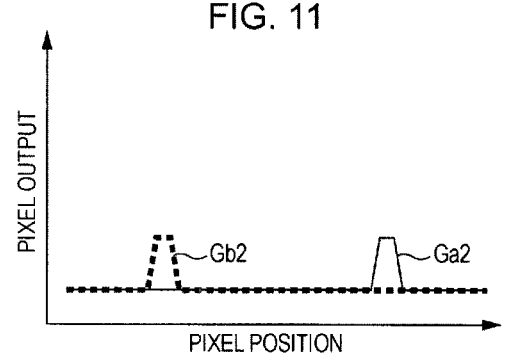
FIG. 11 is a graphic diagram conceptually illustrating a case of when a focal plane is defocused by 200 µm advancing close to the imaging surface.
Figure 12:
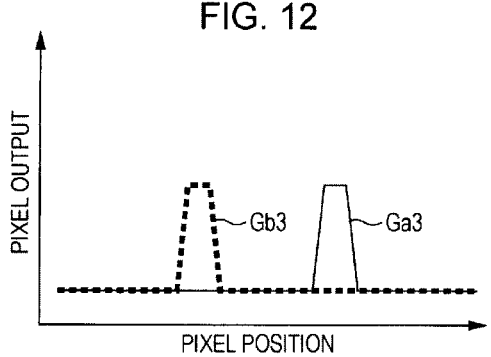
FIG. 12 is a graphic diagram conceptually illustrating a case of when a focal plane is defocused by 100 µm advancing close to the imaging surface.
Figure 13:
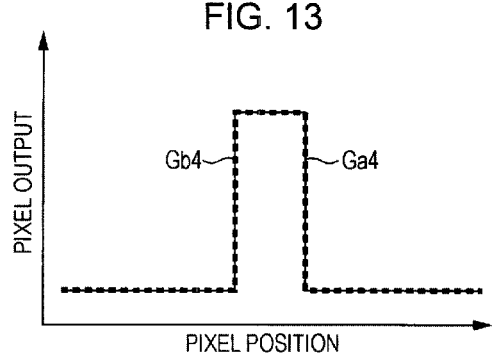
FIG. 13 is a graphic diagram conceptually illustrating an in-focus state where the focal plane coincides with the imaging surface.
Figure 14:
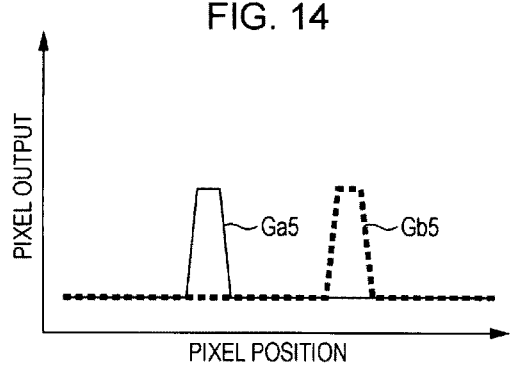
FIG. 14 is a graphic diagram conceptually illustrating a case of when the focal plane is defocused by 100 µm or more advancing away from the imaging surface.
Figure 15:
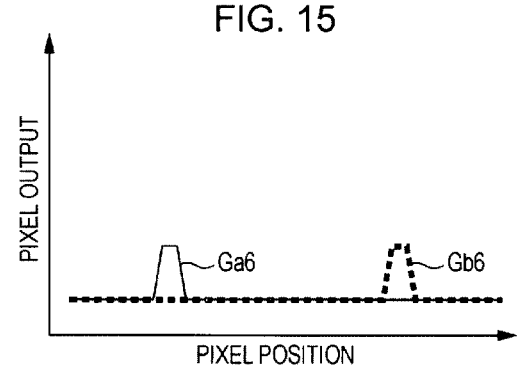
FIG. 15 is a graphic diagram conceptually illustrating a case of when the focal plane is defocused by 200 µm or more advancing away from the imaging surface.
Figure 16:
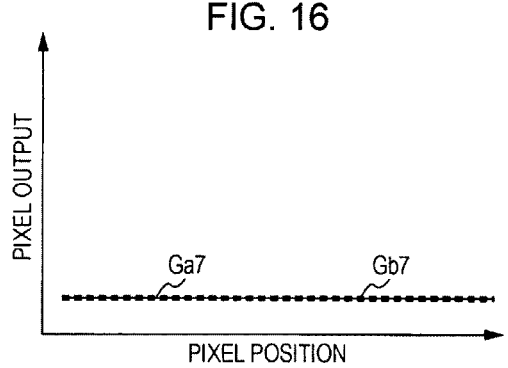
FIG. 16 is a graphic diagram conceptually illustrating a case of when the focal plane is defocused by 10 mm or more advancing away from the imaging surface.

FIG. 10 is a graphic diagram conceptually illustrating a case of when the focal plane is defocused by 10 mm or more advancing close to the imaging surface 101*f* of the imaging element 101. FIG. 11 is a graphic diagram conceptually illustrating a case of when the focal plane is defocused by 100 μm advancing close to the imaging surface 101*f*. FIG. 12 is a graphic diagram conceptually illustrating a case of when the focal plane is defocused by 200 μm advancing close to the imaging surface 101*f*. In addition, FIG. 13 is a graphic diagram conceptually illustrating an in-focus state where the focal plane coincides with the imaging surface 101*f*. Furthermore, FIG. 14 is a graphic diagram conceptually illustrating a case of when the focal plane is defocused by 100 μm advancing away from the imaging surface 101*f*. FIG. 15 is a graphic diagram conceptually illustrating a case of when the focal plane is defocused by 200 μm advancing away from the imaging surface 101*f*. FIG. 16 is a graphic diagram conceptually illustrating a case of when the focal plane is defocused by 10 m or more advancing away from the imaging surface 101*f*.

Referring to FIGS. 10 to 16, as can be seen from the comparison between A-type image sequences indicated by the "A-type" graphs Ga1 to Ga7 and B-type image sequences indicated by the "B-type" graphs Gb1 to Gb7, the greater the amount of defocus, the greater the amount of shift (amount of deviation) produces between the A-type image sequences and the B-type image sequences in the horizontal direction of the imaging element 101.

Figure 17:
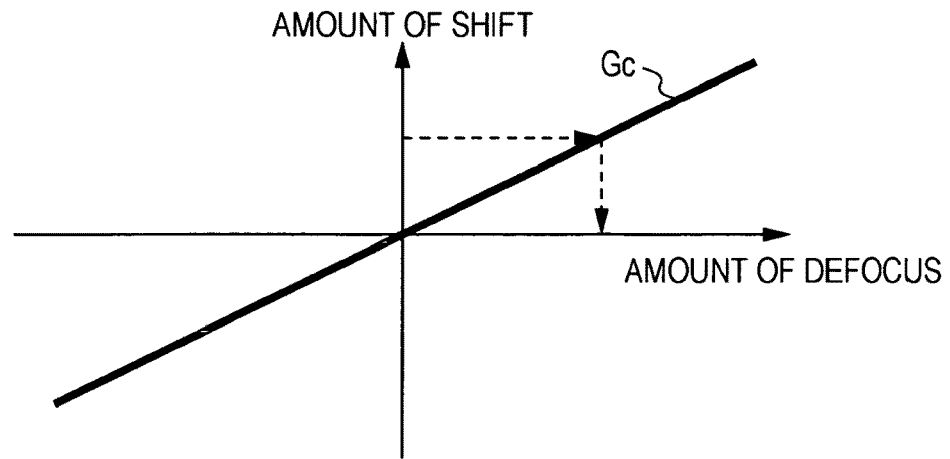
FIG. 17 is a graphic diagram illustrating the relationship between the amount of shift and the amount of defocus.

That is, the relationship between the above amount of shift and the amount of defocusing the focal plane from the imaging surface 101*f* of the imaging element 101 (the amount of defocus) can be represented by, for example, a linear function as a graph Gc in FIG. 17. The inclination of the graph Gc can be obtained in advance during factory test or the like.

Therefore, the above amount of sift is calculated by the phase difference AF calculation circuit 76 based on the output of the AF line Lf of the imaging element 101 and the amount of the defocus is then calculated based on the graph Gc in FIG. 17. AF operation can be performed when the amount of driving equivalent to the calculated amount of defocus is given to the focus lens 211. That is, the main control unit is configured to drive the focus lens 211 toward the in-focus position detected by the focus detection of a phase difference detection system on the basis of pixel signals of the AF line Lf constructed of the group of AF pixel pairs 11f. Therefore, it becomes possible to quickly perform the focus control by the phase difference AF.

Now, when the depth of field of a digital camera is generally taken into consideration, it is preferable to perform the final focus operation by the focus detection (contrast AF) of the contrast detection system with higher focus accuracy than that of the phase difference AF. Then, also in the image pickup apparatus 1 of this embodiment, the contrast AF is employed in order to focusing with high precision. The principle of this contrast AF will be described below.

The contrast AF in the image pickup apparatus 1 reads out the pixel group of G pixels 112 in the AF area Ef described above and then calculates the contrast evaluation value of the AF area Ef (AF evaluation value). Such a contrast evaluation value (hereinafter, simply referred to as a "contrast") is calculated, for example, as the sum of absolute values of differences between adjacent G pixels 112 in the AF area.

Figure 18:
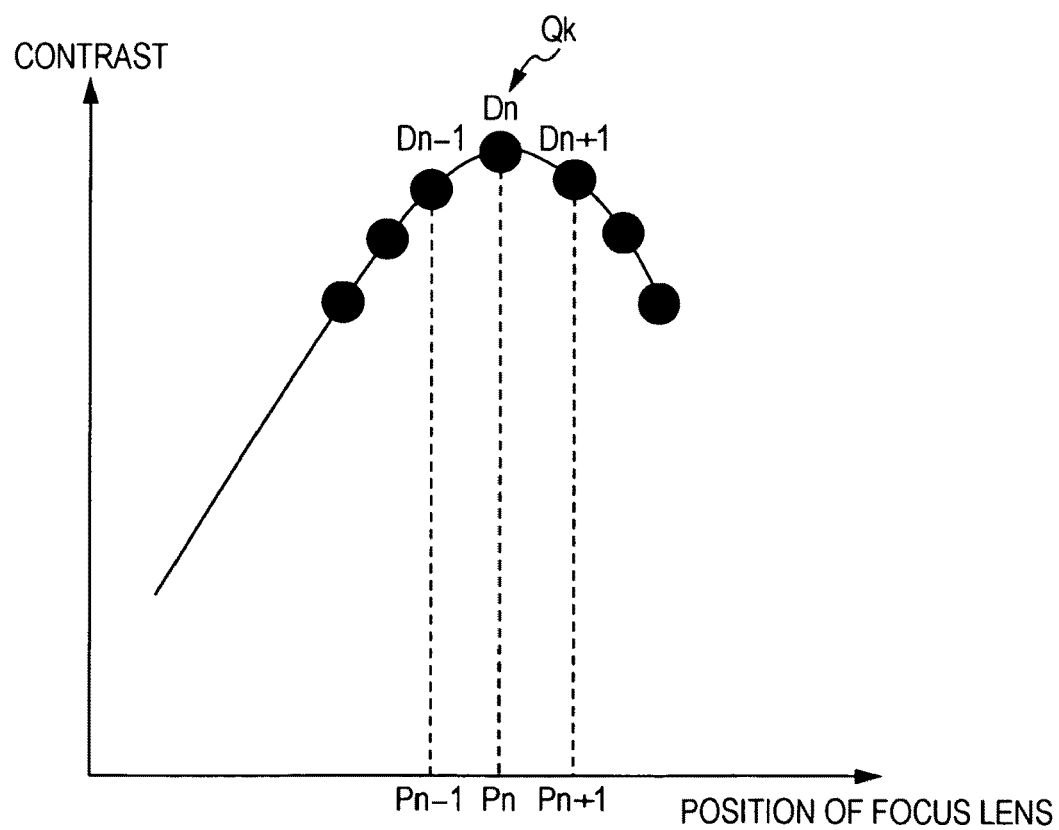
FIG. 18 is a graphic diagram illustrating the principle of contrast AF.

Here, if the contrast is calculated every time the focus lens 211 is shifted in a certain direction, the relationship between the respective values of the contrast and the respective positions of the focus lens 2 can be obtained such that the contrast monotonically increases up to the peak Qk and then monotonically decreases from the peak Qk as shown in FIG. 18. The focus lens 211 is configured to move until it moves beyond the point of focus, or the peak Qk of the contrast.

Subsequently, as shown in FIG. 18, when the contrast values near the peak Qk, Dn−1, Dn, and Dn+1, and the corresponding positions of the focus lens 211, Pn−1, Pn, and Pn+1, are obtained, an in-focus position Pf of the focus lens 211 can be determined using the quadratic interpolation approximation given by Equation (1) below:

[Equation 1]

$$Pf = \frac{Dn-1(Pn+1^2 - Pn^2) + Dn(Pn-1^2 - Pn+1^2) +}{2\{Dn-1(Pn+1-Pn) + Dn(Pn-1-Pn+1) +} \quad (1)$$
$$\frac{Dn+1(Pn^2 - Pn-1^2)}{Dn+1(Pn - Pn-1)\}}$$

In the contrast AF described above, the contrast AF calculation circuit 77 determines a contrast in the AF area Ef, and then the focus driving control unit 71A moves the focus lens 211 to the in-focus position determined by the above Equation (1). Therefore, the autofocus control (AF control) can be performed with high focus accuracy.

Therefore, the image pickup apparatus 1 according to the present embodiment of the invention is able to perform quick AF control with high precision by executing the hybrid AF in which the contrast AF with high focus accuracy is used together with the phase difference AF which can detect an in-focus position at high speed as described above. Specifically, the focus lens 211 is quickly moved close to the in-focus position detected by the phase difference AF, while the final focus control is performed near the in-focus position by the contrast AF.

The contrast AF is not only responsible for driving the lens to the in-focus position by the above hill-climbing AF but also responsible for determining which direction the lens comes into focus in the direction of in-focus position (the point of focus) by making a comparison between the contrasts obtained at different lens positions. In other words, it determines whether the lens comes into focus on the short distance side (hereinafter, simply referred to as a "near side") or the long distance side (hereinafter, simply referred to as a "far side") of a subject.

On the other hand, in the case of the phase difference AF based on the output of the AF line Lf in the imaging element 101, it is generally considered that a measurable range may be shorter than that of the phase difference AF by the typical AF sensor. For example, as shown in FIG. 10 or FIG. 16, the detection of an in-focus position may be not easier than usual under the state of a large amount of defocus.

Thus, if the distance measurement with the AF line Lf is not easily performed in the AF area Ef, the direction of the in-focus position (in-focus direction) is detected by the contrast AF as described above and the focus lens 211 is then moved in this in-focus direction. Subsequently, when the focus lens 211 enters in an allowable range of the distant measurement by the AF line Lf, the focus control by the hybrid AF in combination with the phase difference AF is carried out.

Here, Equation (2) below is used as an evaluation function to determine whether the distance measurement with the AF line Lf is allowable, or whether the reliability of the phase difference AF is high or low. Specifically, it is reliable when the calculated value (output value) J obtained by Equation (2) below is higher than the threshold value Jth previously defined by factory test or the like, while it is not reliable when the calculated value J is not higher than the threshold Jth.

[Equation 2]

$$J = \sum_{i}^{n-1} \left| \frac{Y_{i+1} - Y_i}{X_{i+1} - X_i} \right| \quad (2)$$

In Equation 2, n represents the total number of the AF pixel pairs 11f on the AF line Lf in the AF area Ef, Xi represents a position of the "i"th AF pixel pair 11f from the left side of the AF line Lf, and Yi represents the pixel output of the AF pixel pair 11f at the position Xi.

The reliability of the phase difference AF on the detection of an in-fit position can be simply performed by determining whether a pixel signal generated from the AF line Lf constructed of the group of AF pixel pairs 11f (first pixel group) satisfies predetermined conditions. Specifically, it is determined whether the output value J generated by input of the pixel signal from the AF line Lf into the above Equation (2) satisfies a condition that it is higher than the threshold Jth.

Therefore, the reliability of the phase difference AF can be simply evaluated.

Hereinafter, the focus control of the image pickup apparatus 1 associated with an evaluation of the reliability of phase difference AF will be concretely described below.

[Operation of Image Pickup Apparatus 1]

Figure 19:
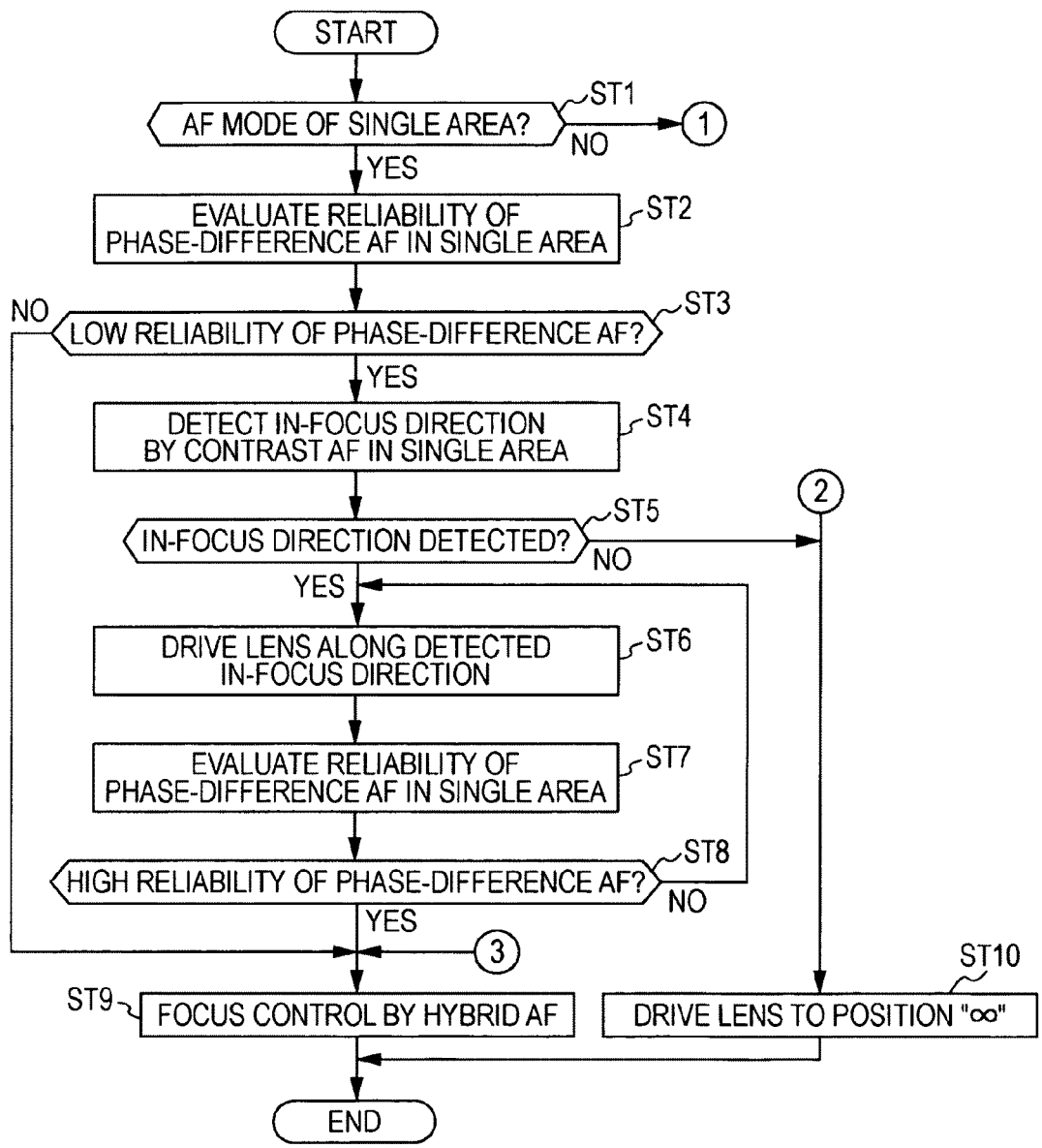
FIG. 19 is a flowchart illustrating a basic operation of the image pickup apparatus.
Figure 20:
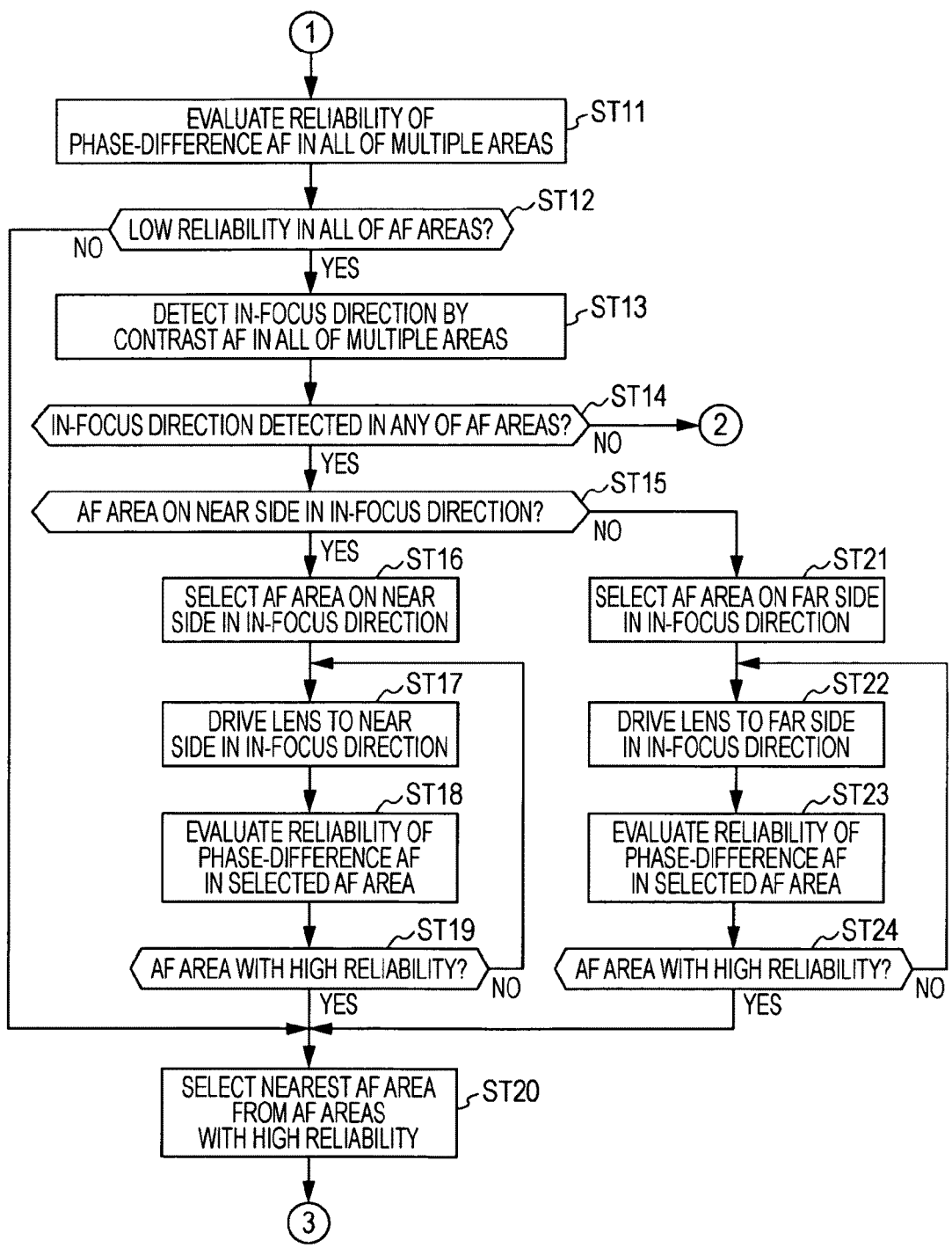
FIG. 20 is a flowchart illustrating a basic operation of the image pickup apparatus.

FIGS. 19 and 20 are flowcharts illustrating a basic operation of the image pickup apparatus 1. This operation is performed by the main control unit 62.

First, the image pickup apparatus 1 is powered on by the main switch 317 to start the imaging element 101. Subsequently, the shutter button 307 is half-pressed to start the AF operation and it is then determined whether an AF mode is a mode for setting a single area (see FIG. 5) (step ST1). Here, if the AF mode is one for setting the single area, the process proceeds to step ST2. If the AF mode is a mode for setting a multi-area (see FIG. 8), the process proceeds to step ST11.

In step ST2, the reliability of phase difference AF is evaluated in the single area. Specifically, in the AF area Efa on the center of the imaging surface 101f shown in FIG. 5, the above Equation (2) is used for determining whether the distance measurement with the AF line Lf is possible.

In step ST3, based on the result of the reliability evaluation in step ST2, it is determined whether the reliability of the phase difference AF is low. Here, if the phase difference AF has low reliability, or the calculated value J obtained by the above Equation (2) is in a numeral range of not higher than the threshold Jth, the process proceeds to step ST4. On the other hand, if the phase difference AF has high reliability, or the calculated value J obtained by the above Equation (2) is out of a numeral range of not higher than the threshold Jth, the process proceeds to step ST9.

Namely, in step ST3, if it is determined that the phase difference AF has high reliability based on a pixel signal generated from the AF line Lf constructed of a group of AF pixel pairs 11f, the focus lens 211 is driven toward an in-focus position detected based on the pixel signal in step ST9 described later. In step ST3, on the other hand, if it is determined that the phase difference AF has low reliability based on the pixel signal generated from the AF line Lf, the focus lens 211 is driven toward an in-focus position detected by the contrast AF in steps ST4 and ST6 described later.

In step ST4, the direction of focusing with the contrast AF in the single area is detected. Specifically, in the AF area Efa on the center of the imaging surface 101f shown in FIG. 5, the contrast is compared with another contrast obtained at a different position of the focus lens 211 as described above. Thus, the in-focus direction of the focus lens 211 is detected (the details thereof will be described later).

In step ST5, it is determined whether the in-focus direction is detected in step ST4. Here, if the in-focus direction is determined, then the process proceeds to step ST6. If it is not detected, then the process proceeds to step ST10. In step ST6, the focus lens 211 is driven by the AF actuator 71M in the in-focus direction detected in step ST4.

In step ST7, like step ST2, the reliability of the phase difference AF in the single area, or the AF area Efa shown in FIG. 5, is evaluated. Here, the reliability of the phase contrast AF during the movement of the focus lens 211 in the in-focus direction detected by the contrast AF is determined. In this way, even if the lens is being driven by the contrast AF, it is possible to quickly switch to the hybrid AF at the time of attaining high reliability by observing the reliability of the phase difference AF.

In step ST8, it is determined whether the reliability of the phase difference AF is high or low based on the result of the reliability evaluation in step ST7. Here, if the phase difference AF has high reliability, the process proceeds to step ST9. If it is low reliability, the process returns to step ST6.

In step ST9, the focus control is performed using the hybrid AF described above. In other words, if it is determined that the reliability of the phase difference AF is high in step ST8 or the subsequent step ST19 or ST29, then the focus lens 211 is driven by the phase difference AF with the hybrid AF in stead of driving the focus lens 211 with the contrast AF. Therefore, even if the phase difference AF by the imaging element 101 at the time of initiating the AF, a suitable focus control can be performed by quickly shifting to the hybrid AF.

In step ST10, it is determined that a subject with low contrast is in a low-contrast state captured in the AF area Ef, and the AF operation is then abandoned and the focus lens 211 is then driven to the non-limited position (position "∞").

In step ST11, the reliability of the phase difference AF is evaluated on the whole multi-area. Specifically, the above Equation (2) is used for determining whether the distance measurement with the AF line Lf is possible in all of nine AF areas Ef of the imaging surface 101f shown in FIG. 8.

In step ST12, it is determined whether the phase difference AF has low reliability in all of the AF areas Ef based on the result of the reliability evaluation in step ST11. Here, if the reliability of the phase difference AF is low in all of the AF areas Ef, or the calculated value J obtained by the above Equation (2) is not higher than the threshold Jth, then the process proceeds to step ST13. On the other hand, if the reliability of the phase difference AF is high in all of the AF areas Ef, or the calculated value J obtained by the above Equation (2) is higher than the threshold Jth, then the process proceeds to step ST20.

Namely, in step ST12, if it is determined that the phase difference AF has high reliability based on a pixel signal generated from the AF line Lf constructed of a group of AF pixel pairs 11f, the focus lens 211 is driven toward an in-focus position detected based on the pixel signal in step ST9 described above. In step ST12, on the other hand, if it is determined that the phase difference AF has low reliability based on the pixel signal generated from the AF line Lf, the focus lens 211 is driven toward an in-focus position detected by the contrast AF in steps ST13, ST17, and ST22 described later.

In step ST13, the direction of focusing with the contrast AF in the whole multi-area is detected. Specifically, in all of nine AF areas Ef of the imaging surface 101f shown in FIG. 8, the contrast is compared with another contrast obtained at a different position of the focus lens 211 as described above. Thus, the in-focus direction of the focus lens 211 is detected (the details thereof will be described later).

In step ST14, it is determined whether there is any AF area Ef in which the in-focus direction is detected in step ST13. Here, if there is any AF area Ef in which the in-focus direction is detected, then the process proceeds to step ST15. If there is no AF area Ef in which the in-focus direction is detected, then the process proceeds to step ST10.

In step ST15, among the AF areas Ef in which the in-focus direction is detected in step ST13, it is determined whether there is an AF area Ef detected on the near side in the in-focus direction. Here, if there is the AF area Ef on the near side in the in-focus direction, then the process proceeds to step ST16. If there is no AF area Ef on the near side, then the process proceeds to step ST21.

In step ST16, all of the AF areas Ef which are detected on the near side in the in-focus direction are selected as targets on which the reliability of the phase difference AF is evaluated.

In step ST17, the focus lens 211 is driven to the near side by the AF actuator 71M.

In step ST18, the reliability of the phase difference AF in all of the AF areas Ef selected in step ST16 is performed. Here, in this case, the reliability of the phase contrast AF during the movement of the focus lens 211 in the in-focus direction detected by the contrast AF is determined in all of the selected AF areas Ef.

In step ST19, it is determined whether there is any AF area Ef in which the phase difference AF has high reliability based on the result of the reliability evaluation in step ST18. Here, if there is the AF area Ef with high reliability, then the process proceeds to step 20. If there is no AF area Ef with high reliability, then the process proceeds to step ST17.

In step ST20, the AF area Ef on the nearest side among the AF areas Ef in which the phase difference AF has high reliability is selected as an AF area Ef to be used for the hybrid AF in the above step ST9. Therefore, the drive of the focus lens 211 is performed by the hybrid AF in step ST9 so that the focus lens 211 can move to an in-focus position detected based on the pixel signal from the AF line Lf in one AF area Ef in which a subject, a focusing target, is located on the nearest position from the image pickup apparatus 1 among nine AF areas (focus detection areas) Ef. Therefore, it becomes possible to perform suitable focus control by the phase difference AF giving priority to the near side.

In step ST21, all of the AF areas Ef which are detected on the far side in the in-focus direction are selected as targets on which the reliability of the phase difference AF is evaluated.

In step ST22, the focus lens 211 is driven to the far side by the AF actuator 71M.

In step ST23, the reliability of the phase difference AF in all of the AF areas Ef selected in step ST21 is performed.

In step ST24, it is determined whether there is any AF area Ef in which the phase difference AF has high reliability based on the result of the reliability evaluation in step ST23. Here, if there is the AF area Ef with high reliability, then the process proceeds to step 20. If there is no AF area Ef with high reliability, then the process proceeds to step ST22.

Hereinafter, the operation executed in each of steps ST4 and ST13, or the detecting operation with the contrast AF in the in-focus direction will be described below with reference to FIG. 21.

Figure 21:
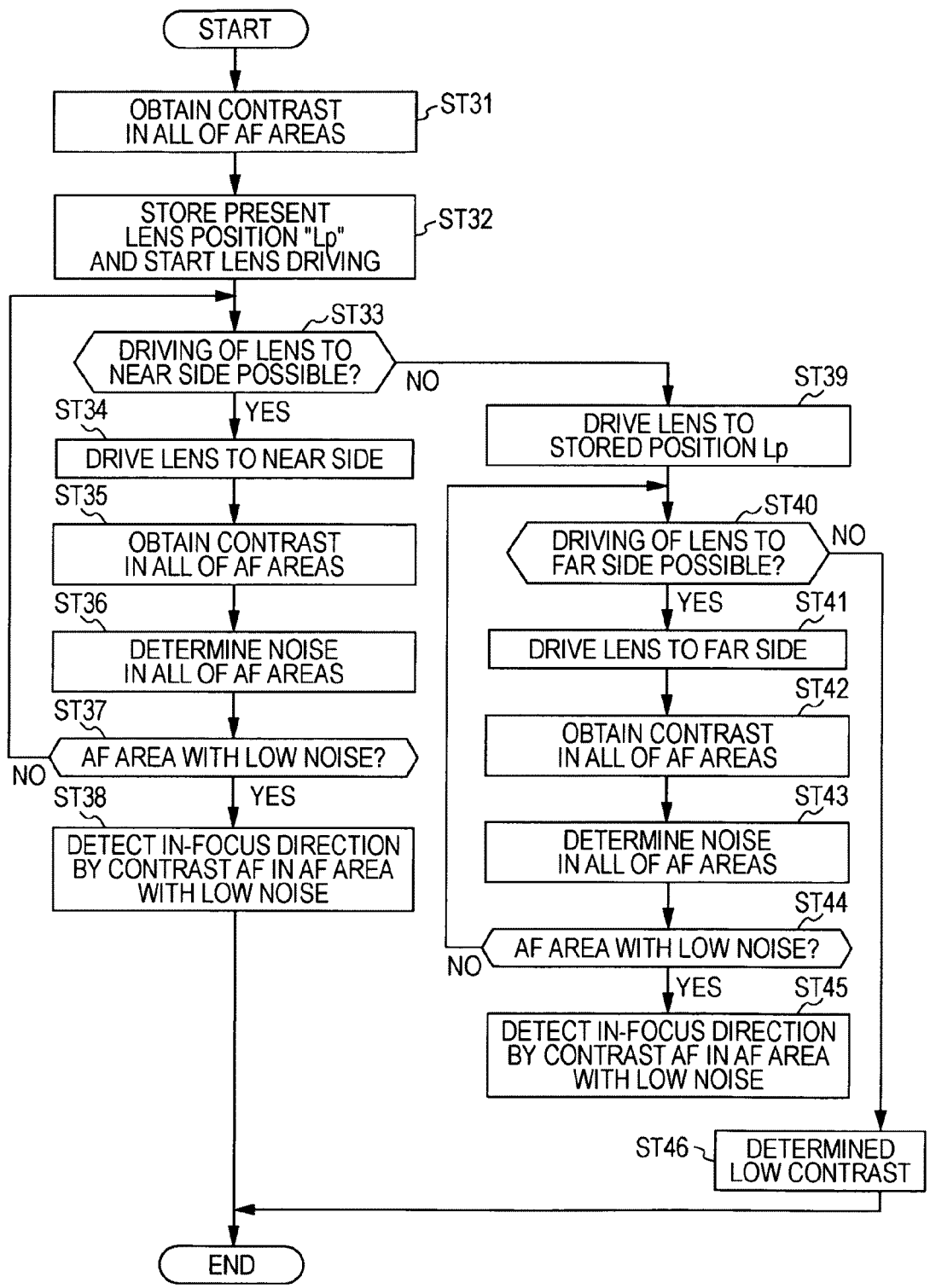
FIG. 21 is a flowchart illustrating the detecting operation in the in-focus direction with the contrast AF.
Figure 22:
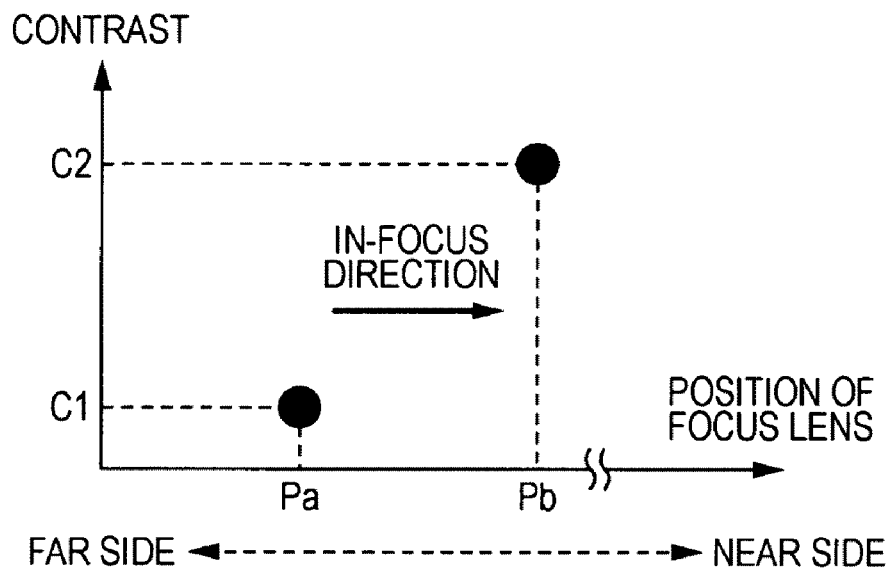
FIG. 22 is a diagram illustrating the detection of the in-focus direction with the contrast AF.
Figure 23:
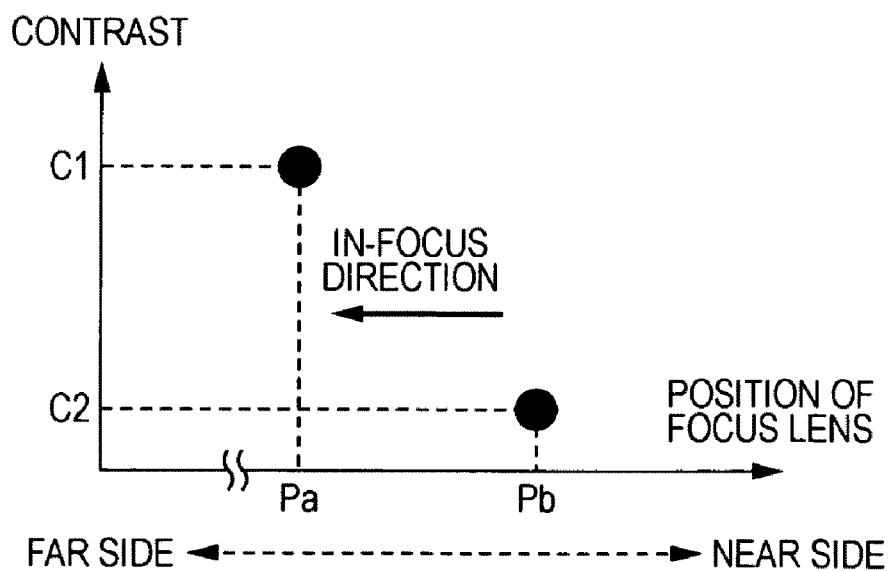
FIG. 23 is a diagram illustrating the detection of the in-focus direction with the contrast AF.

FIG. 21 is a flowchart illustrating the detecting operation in the in-focus direction with the contrast AF.

In step ST31, the contrasts are obtained by calculation in all of the AF areas Ef. Here, if the AF mode is one for setting the single area, the evaluated value of contrast is calculated in one AF area Ef shown in FIG. 5. If the AF mode is one for setting a multi-area (see FIG. 8), the evaluated value of contrast is calculated in all of nine AF areas Ef. The calculated contrasts are recorded in the memory of the main control unit 62.

In step S32, the present position Lp of the focus lens 211 detected by the lens position detection unit 25 is recorded in the memory of the main control unit 62 and the drive of the focus lens 211 is then initiated. The drive of the focus lens 211 employs drive control that gives priority to the near side, and the lens can be driven to the near side.

In step ST33, it is determined whether the focus lens 211 can be driven to the near side. In other words, if the focus lens 211 is located on a drive-limiting position (mechanical end) on the near side by the lens driving mechanism 24 and thus the focus lens 211 does not move to the near side, it is determined whether the focus lens 211 is located at this position. Here, if the lens can be driven to the near side, then the process proceeds to step ST34. If the lens is not driven, then the process proceeds to step ST39.

In step ST34, by using the AF actuator 71M, the focus lens 211 is slightly moved to the near side by the amount of lens drive previously defined by factory test or the like (hereinafter, also referred to as "minimal drive"). In other words, the focus driving control unit 71A controls the minimal drive of the focus lens 211 from the first position to the second position.

In step ST35, just as with step ST31, the contrast of the whole AF area Ef is calculated and obtained. The obtained contrast is recorded in the memory of the main control unit 62.

In step ST36, the contrast of the whole AF area Ef obtained in step ST35 is subjected to noise determination. Specifically, if the calculated value C obtained by Equation (3) below is lower than the threshold Cth previously defined by factory test or the like, it is determined that there are few noises. If it is not lower than the threshold Cth, then it is determined that there are many noises.

$$C = |C1 - C2| \quad (3)$$

In Equation (3), C1 represents a contrast obtained before the minimal drive of the focus lens 211, C2 represents a contrast obtained after the minimal drive.

In step ST37, it is determined whether there is any AF area Ef with few noises in the noise determination in step ST36. Here, if there is the AF area Ef with few noises, then the process proceeds to step 38. If there is no AF area Ef with few noises, then the process returns to step ST33.

In step ST38, the detection of the in-focus direction with the contrast AF is performed using the AF area Ef with few noises. In the detection of the in-focus direction, if the contrast C1 obtained at the position Pa before the minimal drive of the focus lens 211 is smaller than the contrast C2 obtained at the lens position Pb after the minimal drive when the focus lens 211 is driven to the near side, it is determined that an in-focus position is located on the near side. On the other hand, if the contrast C1 obtained at the position Pa before minimal drive is larger than the contrast C2 obtained at the lens position Pb after the minimal drive, it is determined that an in-focus position is located on the far side.

In other words, a contrast (first information) C1 is obtained when the focus lens 211 is located at first position Pa before the minimal drive and a contrast (second information) C2 is obtained when the focus lens 211 is located at second position Pb after the minimal drive by the operation in step ST35 (or step ST31) on the basis of pixel signals generated from the group of normal pixels 110 (second pixel group). Subsequently, in step ST38, the direction of an in-focus position of the focus lens 211 can be detected by making a comparison between the contrasts C1 and C2.

In step ST39, the focus lens 211 is driven to the lens position Lp recorded in the memory of the main control unit 62 in step ST32.

In step ST40, it is determined whether the focus lens 211 can be driven to the far side. In other words, the focus lens 211 is located on the drive-limiting position (mechanical end) on the far side by the lens driving mechanism 24 and thus the focus lens 211 does not move to the near side. It is determined whether the focus lens 211 is located at this position. Here, if the lens can be driven to the far side, then the process proceeds to step ST41. If the lens is hardly driven to the far side, then the process proceeds to step ST46.

In step ST41, the AF actuator 71M is employed to drive the focus lens 211 to the far side as much as the amount of lens drive previously defined by factory test or the like.

steps ST42 to ST45 perform the same operations as those of the above steps ST35 to ST38, respectively.

In step ST46, it is determined that a subject with low contrast is in a low-contrast state captured in the AF area Ef.

The operation of the above image pickup apparatus 1 is able to evaluate the reliability of the phase difference AF using the above Equation (2) based on the pixel output from the AF line Lf. If the reliability is high, the hybrid AF with the phase difference AF is performed. On the other hand, if the reliability is low, the focus lens 211 is driven in the in-focus direction detected by the contrast AF. Therefore, a suitable focus control can be performed even when the phase difference AF by the imaging element (imaging element with a phase contrast detection function) 101 is difficult.

Modified Embodiment

In the evaluation of the reliability of the phase difference AF in the above embodiment, the above Equation (2) may not be used as an evaluation function. Alternatively, any function that can determine whether the distance measurement with the AF line Lf is allowable may be used in stead of Equation (2).

In the imaging device of the above embodiment, as shown in FIG. 7, it is not necessary that 10 normal pixel lines Ln are placed between the AF lines Lf next to each other in the vertical direction. Alternatively, not more than nine normal pixel lines Ln or 11 or more normal pixel lines Ln may be sandwiched between the AF lines Lf.

The first AF pixel 11a and the second AF pixel 11b in the above embodiment may be provided with color filters, respectively. The color filter may lead to a decrease in sensitivity, while allowing a user to obtain photographic color pixel data.

In the case of the image pickup apparatus according to the above embodiment, the photographic lens 2 may not be removably attached to the camera body 10. Alternatively, the photographic lens 2 may be fixed on the camera body 10.

The evaluated value of contrast in the present embodiment, the calculation of the sum of absolute values of differences between adjacent G pixels 11g in the AF area Ef may not be used. Alternatively, the sum of the square absolute values of the differences may be calculated.

It should be understood by those skilled in the art that various modifications, combinations, sub-combinations and alterations may occur depending on design requirements and other factors insofar as they are within the scope of the appended claims or the equivalents thereof.

What is claimed is:

1. An image pickup apparatus, comprising:
drive control means for controlling driving of a focus lens from a first position to a second position in a photographic optical system;
an imaging element having a first pixel group realizing a pupil dividing function by receiving light fluxes from a subject passing through a pair of portion areas oppositely biased from each other in a predetermined direction on an exit pupil in said photographic optical system and a second pixel group without said pupil dividing function; and
focus control means for driving said focus lens toward an in focus position detected by focus detection of a phase difference detection system from a pixel signal of said first pixel group, wherein
said means for controlling focusing includes:
focus direction detecting means for detecting said in focus position by making a comparison between first information and second information, where said first information is obtained as focus detection information to be used for focus detection of a contrast detection system based on a pixel signal generated from said second pixel group when said focus lens is located at said first position, and said second information is obtained as said focus detection information based on a pixel signal generated from said second pixel group when said focus lens is located at said second position;
determination means for determining reliability of detecting said in focus position depending on whether or not said pixel signal from said first pixel group satisfies a predetermined condition;
first control means for driving said focus lens toward an in focus position detected based on said pixel signal from said first pixel group when said determination means determines that said pixel signal from said first pixel group satisfies said predetermined condition and said reliability is high; and
second control means for driving said focus lens toward an in focus position detected by said focus direction detecting means when said determination means determines that said pixel signal from said first pixel group does not satisfy said predetermined condition and said reliability is low,
wherein prior to driving said focus lens toward an in focus position, said determination means determines whether said reliability is high or low, and when said reliability is low said second control means drives said focus lens, said determination means determines said reliability during driving of said focus lens by said second control means, and said focus control means performs driving of said focus lens by said first control means in stead of driving said focus lens by said second control means when said reliability determination means determines that said reliability is high.

2. The image pickup apparatus according to claim 1, wherein
a plurality of focus detection areas having said first pixel group is defined on an imaging surface of said imaging element,
said means for controlling focusing includes means for driving said focus lens toward an in focus position detected based on a pixel signal from a first pixel group in a focus detection area that allows a focusing target to be closest to said image pickup apparatus among said plurality of focus detection areas.

3. A focus control method comprising the steps of:
controlling driving of a focus lens from a first position to a second position in a photographic optical system (step of drive control); and
receiving light fluxes from a subject passing through a pair of portion areas oppositely biased from each other in a predetermined direction on an exit pupil in said photographic optical system, and then driving said focus lens toward an in focus position detected by focus detection of a phase difference detection system from a pixel signal from a first pixel group of an imaging element that realizes a pupil dividing function (step of focus control),
wherein
said step of focus control includes the substeps of:
detecting said in focus position by making a comparison between first information and second information, where said first information is obtained as focus detection information to be used for focus detection of a contrast detection system based on a pixel signal generated from said second pixel group of said imaging element without said pupil dividing function when said focus lens is located on said first position, and said second information is obtained as said focus detection information based on a pixel signal generated from said second pixel group when said focus lens is located at said second position (substep of in focus direction detection);

determining reliability of detecting said in focus position depending on whether or not said pixel signal from said first pixel group satisfies a predetermined condition (substep of determination);

driving said focus lens toward an in focus position detected based on said pixel signal from said first pixel group when said determination means determines that said pixel signal from said first pixel group satisfies said predetermined condition and said reliability is high (subset of first control); and driving said focus lens toward an in focus position detected by said substep of in focus direction detection when said substep of determination determines that said pixel signal from said first pixel group does not satisfy said predetermined condition and said reliability is low (substep of second control), wherein prior to driving said focus lens toward and in focus position, either detected based on said pixel signal from said first pixel group or detected by said substep of in focus direction detection, determining whether said reliability is high or low, and when said reliability is low driving said focus lens toward an in focus position detected by said substep of in focus direction detection, determining said reliability during driving said focus lens toward an in focus position detected by said substep of in focus direction detection, and driving said focus lens toward an in focus position detected based on said pixel signal from said first pixel group in stead of driving said focus lens toward an in focus position detected by said substep of in focus direction detection when it is determined that said reliability is high.

4. An image pickup apparatus, comprising:

a drive control section controlling driving of a focus lens from a first position to a second position in a photographic optical system;

an imaging element having a first pixel group realizing a pupil dividing function by receiving light fluxes from a subject passing through a pair of portion areas oppositely biased from each other in a predetermined direction on an exit pupil in said photographic optical system and a second pixel group without said pupil dividing function; and a focus control section driving said focus lens toward an in focus position detected by focus detection of a phase difference detection system from a pixel signal of said first pixel group, wherein said section controlling focusing includes:

a focus, direction detecting section detecting said in focus position by making a comparison between first information and second information, where said first information is obtained as focus detection information to be used for focus detection of a contrast detection system based on a pixel signal generated from said second pixel group when said focus lens is located at said first position, and said second information is obtained as said focus detection information based on a pixel signal generated from said second pixel group when said focus lens is located at said second position;

a determination section determining reliability of detecting said in focus position depending on whether or not said pixel signal from said first pixel group satisfies a predetermined condition;

a first control section driving said focus lens toward an in focus position detected based on said pixel signal from said first pixel group when said determination section determines that said pixel signal from said first pixel group satisfies said predetermined condition and said reliability is high; and a second control section driving said focus lens toward an in focus position detected by said focus direction detecting section when said determination section determines that said pixel signal from said first pixel group does not satisfy said predetermined condition and said reliability is low, wherein prior to driving said focus lens toward an in focus position, said determination section determines whether said reliability is high or low, and when said reliability is low said second control section drives said focus lens, said determination section determines said reliability during driving of said focus lens by said second control section, and said focus control section performs driving of said focus lens by said first control section in stead of driving said focus lens by said second control section when said reliability determination section determines that said reliability is high.

* * * * *